United States Patent [19]
Hirano et al.

[11] Patent Number: 6,112,574
[45] Date of Patent: Sep. 5, 2000

[54] EXHAUST GAS ANALYZER AND MODAL MASS ANALYSIS METHOD BY GAS TRACE PROCESS USING THE ANALYZER THEREOF

[75] Inventors: Takashi Hirano; Masayuki Adachi, both of Kyoto, Japan

[73] Assignee: Horiba Ltd, Kyoto, Japan

[21] Appl. No.: 09/027,610

[22] Filed: Feb. 23, 1998

Related U.S. Application Data

[63] Continuation-in-part of application No. 09/012,746, Jan. 23, 1998.

[30] Foreign Application Priority Data

| Jan. 25, 1997 | [JP] | Japan | 9-025954 |
| Jan. 31, 1997 | [JP] | Japan | 9-033032 |
| Feb. 14, 1997 | [JP] | Japan | 9-047100 |
| Oct. 23, 1997 | [JP] | Japan | 9-309382 |

[51] Int. Cl.$^7$ ............................................. G01N 7/00
[52] U.S. Cl. ................................................. 73/23.31
[58] Field of Search ....................... 73/118.1, 23.31, 73/23.32, 861.05, 861.04, 861.07

[56] References Cited

U.S. PATENT DOCUMENTS

| 3,634,053 | 1/1972 | Klass et al. . | |
| 3,727,048 | 4/1973 | Haas | 250/302 |
| 3,873,228 | 3/1975 | Nemeth et al. . | |
| 3,924,442 | 12/1975 | Kerho et al. | 73/23.21 |
| 3,986,386 | 10/1976 | Beltzer et al. | 73/23.31 |
| 4,121,455 | 10/1978 | Haslett et al. . | |
| 4,727,746 | 3/1988 | Mikasa et al. | 73/23.31 |
| 5,594,179 | 1/1997 | Marsh . | |
| 5,639,957 | 6/1997 | Zarchy | 73/23.31 |
| 5,672,827 | 9/1997 | Jursich | 73/861.07 |

FOREIGN PATENT DOCUMENTS 8-015253   1/1996   Japan .

*Primary Examiner*—William Oen
*Attorney, Agent, or Firm*—Oppenheimer Wolff & Donnelly, LLP

[57] ABSTRACT

An exhaust gas analyzer for measuring a dry-based concentration and a dry-based flow rate of exhaust gas from a vehicle has a trace gas supply source for providing a trace gas to the vehicle at a supply rate, a flow rate controller for controlling the supply rate of the trace gas, a exhaust gas sampling passage in communication with an exhaust pipe of the vehicle for sampling the exhaust gas from the vehicle, a dehumidifier disposed on the exhaust gas sampling passage, a trace gas detector disposed on the exhaust gas sampling passage for measuring the trace gas, and a gas analyzer disposed on the exhaust gas sampling passage for measuring a component to be measured in the exhaust gas. The trace gas detector and the gas analyzer are disposed downstream from the dehumidifier and in parallel on the exhaust gas sampling passage.

10 Claims, 16 Drawing Sheets

FIG. 1
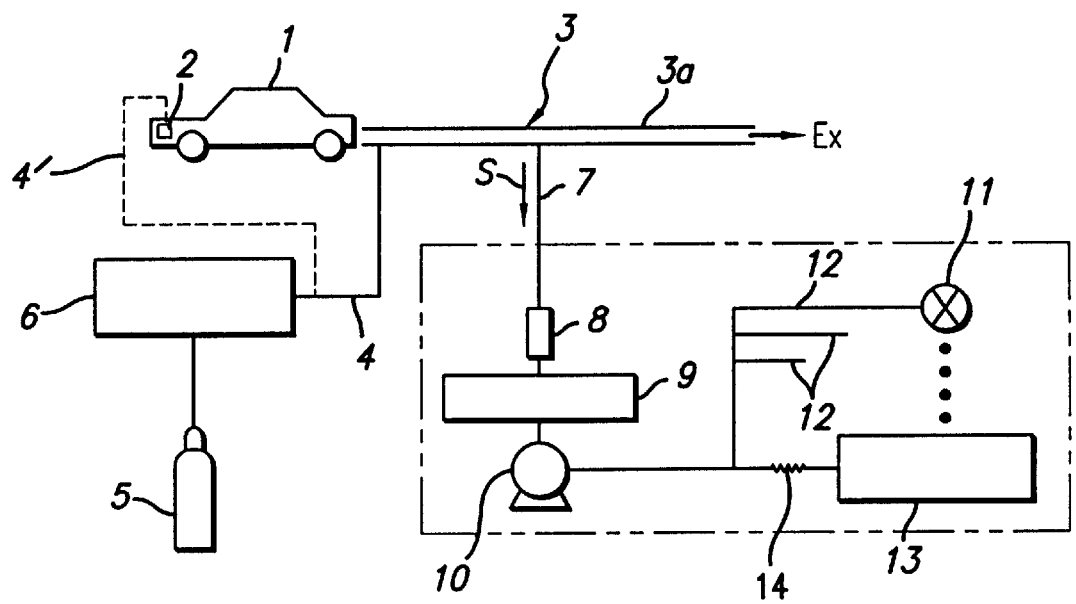
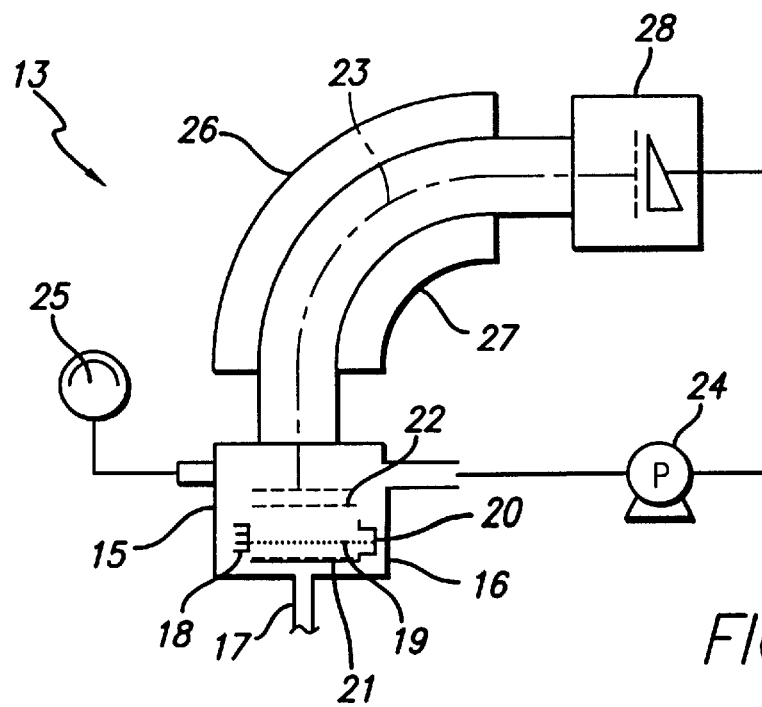
FIG. 2

FIG. 9A
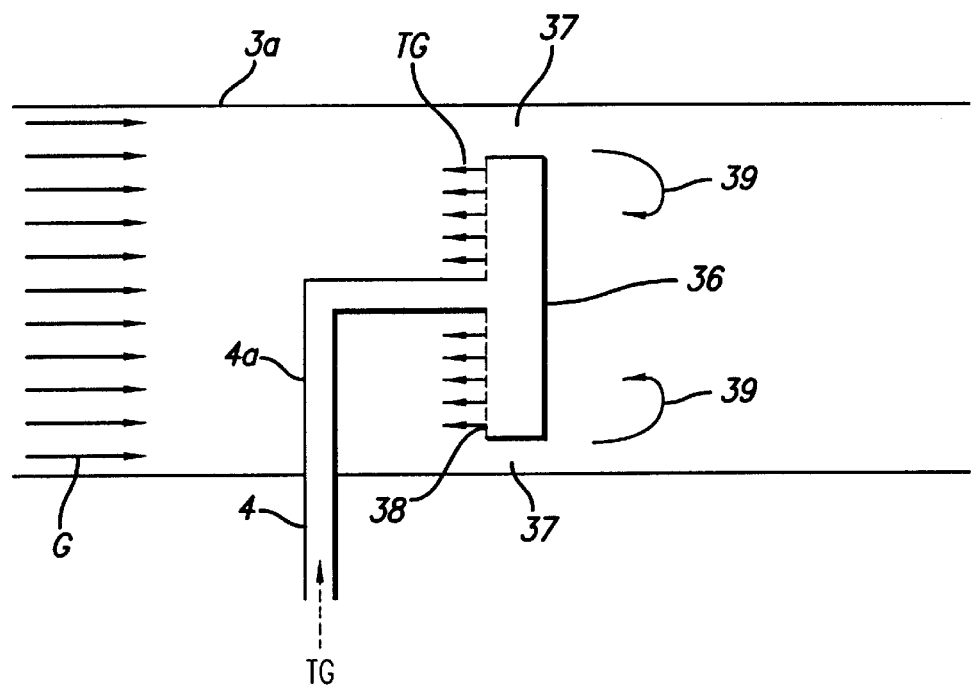
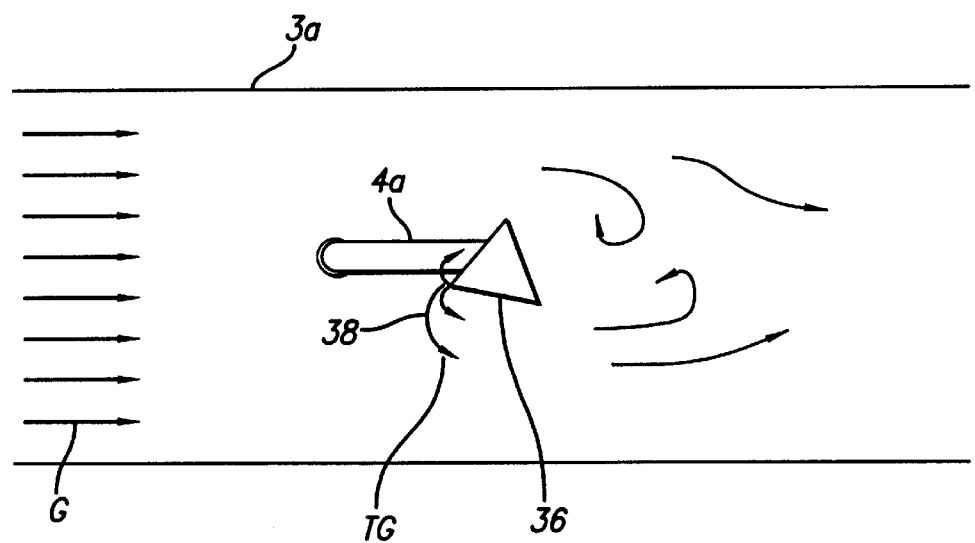
FIG. 9B

FIG. 10
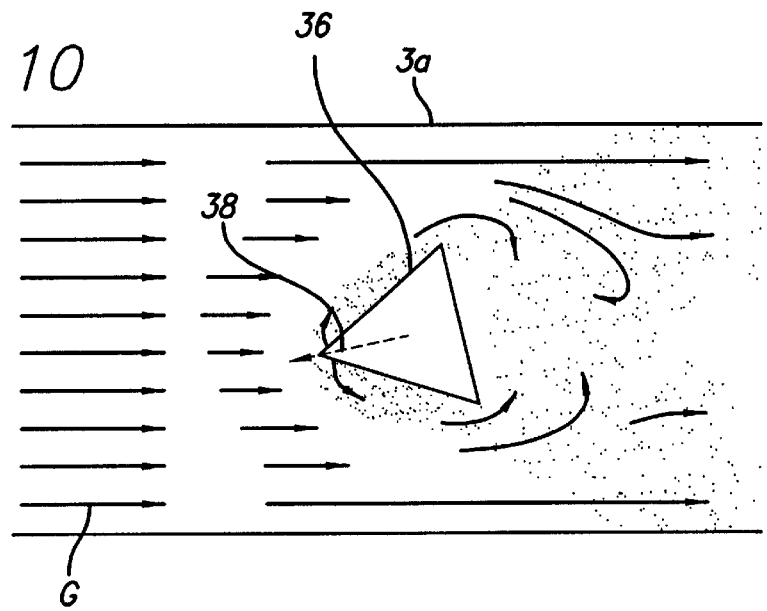
FIG. 11A
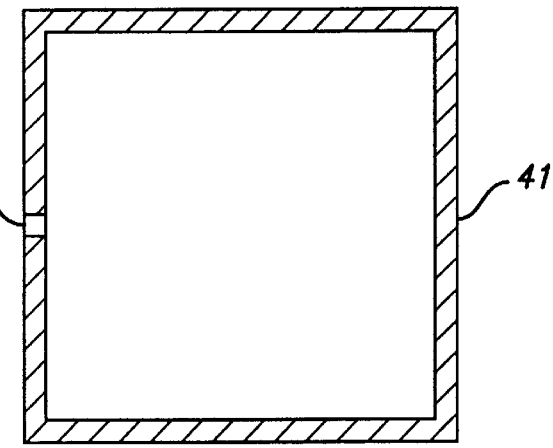
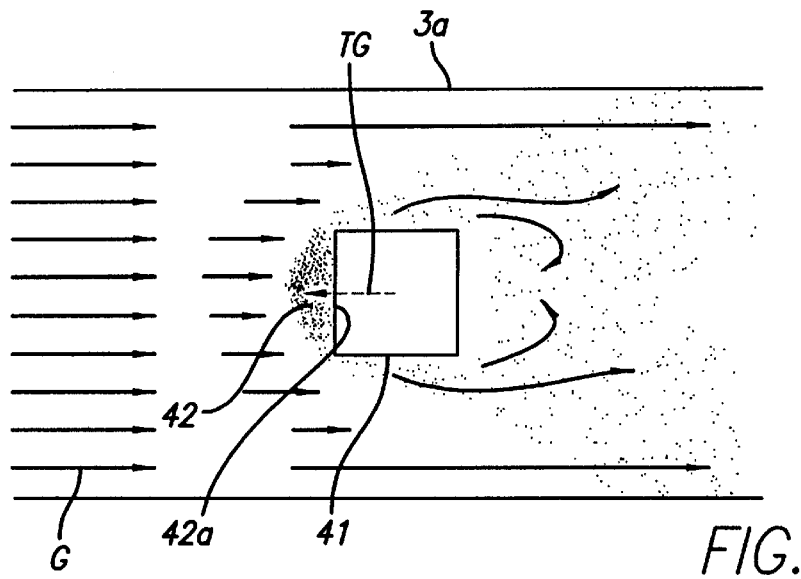
FIG. 11B

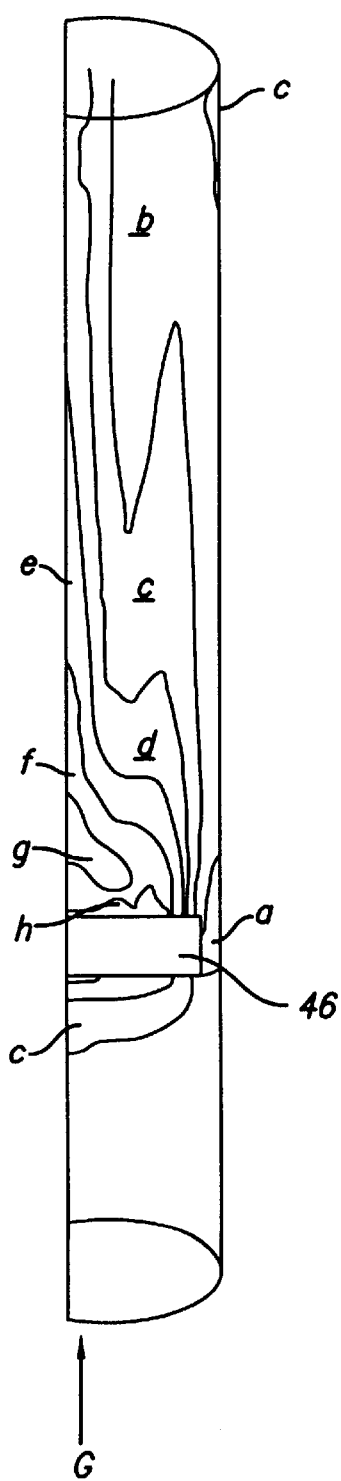
FIG. 14A
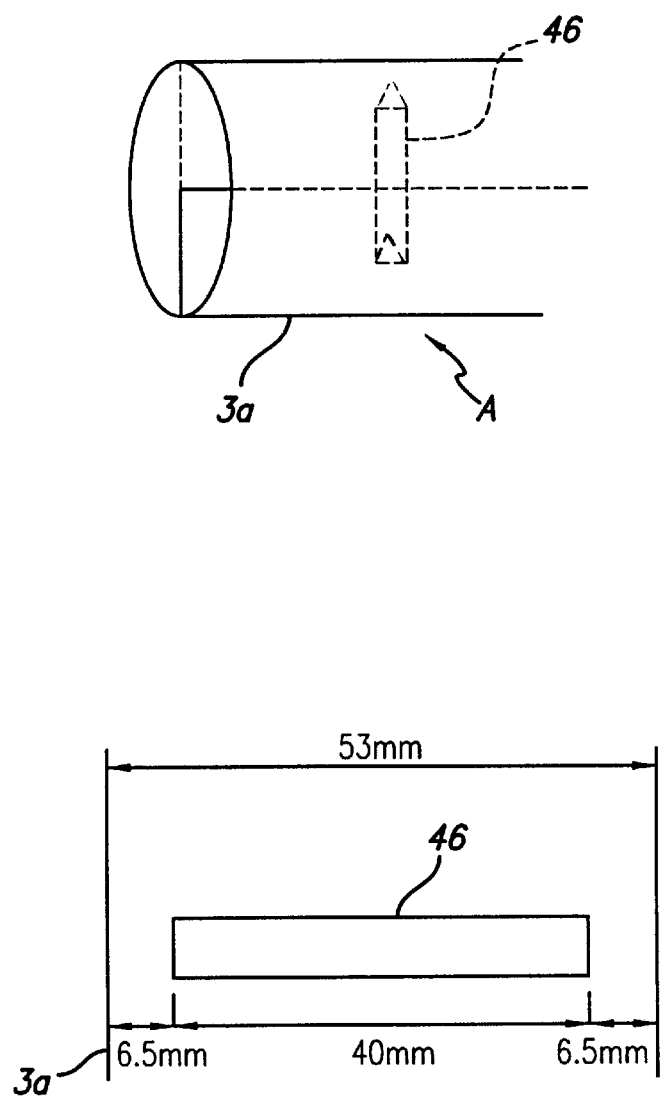
FIG. 14B
FIG. 14C

FIG. 18A
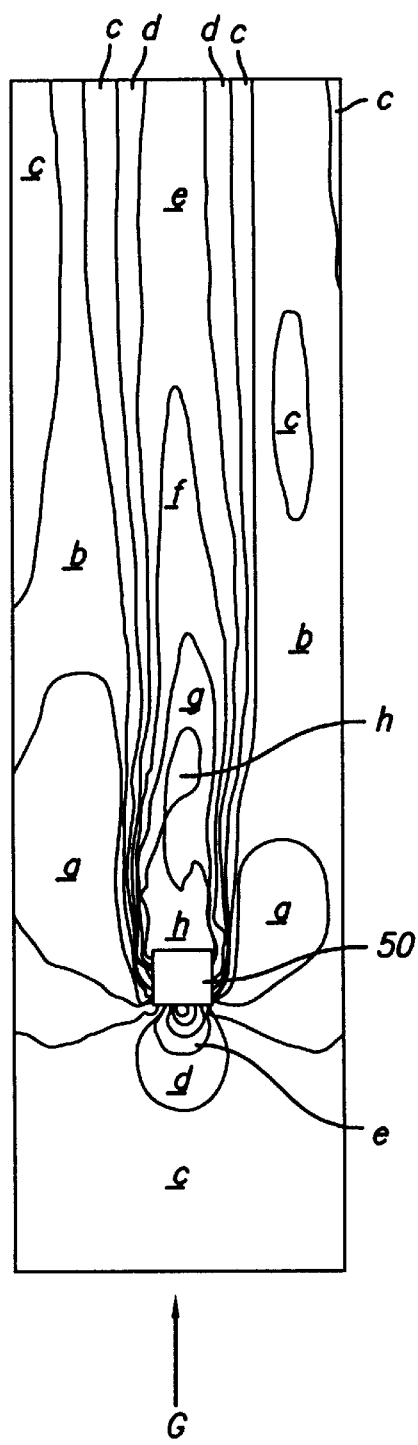
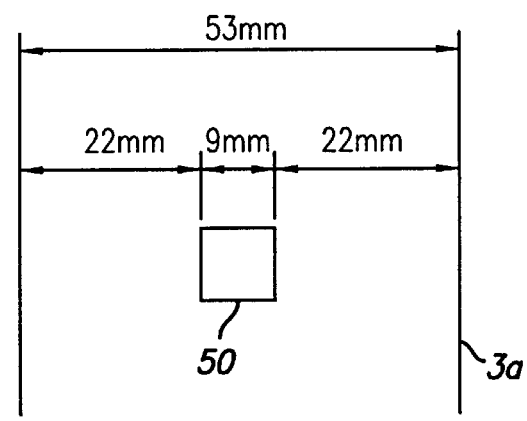
FIG. 18B

EXHAUST GAS ANALYZER AND MODAL MASS ANALYSIS METHOD BY GAS TRACE PROCESS USING THE ANALYZER THEREOF

CROSS-REFERENCE TO RELATED APPLICATIONS

The present invention is a continuation-in-part application of U.S. Pat. application Ser. No. 09/012,746 filed on Jan. 23, 1998.

FIELD OF THE INVENTION

The present invention relates to an exhaust gas analyzer system for measuring a mass emission rate of each specific component gas in exhaust gas discharged from automobiles by driving modes. The present invention also relates to a modal mass analysis method by gas trace processes using the exhaust gas analyzer.

BACKGROUND OF THE INVENTION

In order to carry out transient characterization of gas discharged from internal combustion engines (hereinafter call "exhaust gas"), the exhaust gas flow rate must be measured in real time. A trace method is one technique used to continuously measure the exhaust gas flow rate. This trace method introduces inert gas, for example, helium gas, which does not react with the components in the exhaust gas to the exhaust passage linked to the internal combustion engine. The method then measures the helium gas concentration with a trace gas analyzer connected to the gas sampling passage connected to the exhaust passage. The exhaust gas flow rate is then determined in real time by dividing the introducing rate of the helium gas by the concentration of the helium gas.

Examples of equipment for measuring the exhaust gas flow rate operating on the above-mentioned conventional measuring principle include that disclosed in Japanese non-examined Patent Publication No. Hei 8-15253. FIG. 22 schematically shows conventional engine exhaust gas flow rate measuring equipment disclosed in this patent publication. Numeral 71 designates an engine, numeral 72, a compressed gas cylinder for introducing helium gas as inert gas into this engine 71, and numeral 73, a pressure reducing valve. Numeral 74 designates an exhaust passage linked to the engine 71. Numeral 75 designates a gas sampling passage branched and connected to the exhaust passage 74 at the upstream side, which is equipped with a filter 76 and a suction pump 77, and joined and connected to the exhaust passage 74 on the downstream side. Numeral 78 designates a trace gas analyzer connected to the gas sampling passage 75 via a connecting member 79.

The trace gas analyzer 78 may be a quadruple mass spectrometer, sector field mass spectrometer, or similar device, but since these analyzers have a high vacuum inside, microleakage orifice or variable leak valve (VLV) is used for the connecting member 79 in connecting to the gas sampling passage 75 to which the filter 76, the suction pump 77, etc. are installed.

In measuring the exhaust gas flow rate, for example, helium gas must be introduced as a trace gas into the exhaust pipe 74a linked to the engine 71. But conventionally, as shown in FIG. 23, a pipe 75 comprising of, for example, tetrafluorethylene resin which is strong to, for example, exhaust gas G and can withstand comparatively high temperature, is inserted and connected to cross nearly at right angles to the direction in which the exhaust gas G flows. Helium gas TG is introduced as trace gas to the exhaust pipe 74a in which exhaust gas G flows via this pipe 75. However, in the above-mentioned configuration a number of problems exist as described below, and the measurement accuracy of the exhaust gas flow rate is not always satisfactory.

As the microleakage orifice of VLV has a large inside dead volume, when a plurality of other gas analyzers are connected to the gas sampling passage 75 and exhaust gas components such as CO, $CO_2$, $NO_x$, HC, etc. are analyzed with these gas analyzers, lag time is generated in the trace gas analyzer 78 and the gas analyzer, and the output timing must be adjusted in both analyzers.

As the inside of the trace gas analyzer 78 is originally of high vacuum, the sensitivity varies in accordance with the gas component ratio in the exhaust gas. That is, when the trace gas analyzer 78 has its temperature adjusted to a specified level, helium gas is introduced while being mixed in the exhaust gas at a specified concentration via the connecting member 79. In the continuous measurement of exhaust gas discharged from the internal combustion engine such as automobile engines, if the exhaust gas component to be measured suddenly changes, the difference is generated in pressure inside the trace gas analyzer 78 due to the difference of viscosity depending on this exhaust gas component. If the pressure, volume, and temperature inside the trace gas analyzer 78 are denoted by P, V (constant), and T (constant), then the equation $PV=nRT$ (n: molecular number of helium gas and R: constant) holds for the helium gas. But when the pressure change $\Delta P$ is, for example, positive, since P is proportional to n in the above equation, the introducing amount of helium gas increases, and the reading of the helium gas in the exhaust gas becomes higher than the actual value. Also, the low exhaust gas flow rate is indicated. On the contrary, if the pressure variation is negative, the helium introducing volume decreases in proportion to this variation, and then the reading of helium gas in the exhaust gas becomes lower than the actual value. And for exhaust gas flow rate, a higher value is obtained.

In FIG. 23, while the inside diameter of exhaust pipe 74a is as large as 100 mm, that of the pipe 75 for introducing helium gas is about 4 mm. As pipe 75 is inserted in such a manner to simply cross at right angles with the flowing direction of exhaust gas with respect to the exhaust gas 74a, mixing of the exhaust gas G from the engine with helium gas TG does not always take place satisfactorily. Consequently, errors occur in the helium gas concentration measurement results by the trace gas analyzer 78, and there has been an inconvenience in that the measurement accuracy of the exhaust gas flow rate is not always satisfactory.

On the other hand, with respect to the sensitivity calibration method, conventionally pure nitrogen gas ($N_2$) is used for zero gas. At the same time, a mixture of several tens to several thousands ppm of helium gas is added with pure $N_2$ as base for span gas which is used for zero calibration and span calibration of the trace gas analyzer. Problems analogous to those described above exist with this configuration.

As no consideration is given to carbon dioxide ($CO_2$) contained in a large quantity next to $N_2$ in the exhaust gas and as calibration was carried out, the sensitivity change and the desired sensitivity calibration are unable to be carried out. With regard to the calculation of continuous mass emission rate from a car, the measured flow rate and a gas concentration for each gaseous constituents must be multiplied. In the conventional way, since the flow rate is always measured as a whole, gaseous constituents and the gas concentration is typically dehumidified concentration, either the measured flow rate must be converted to dehumidified concentration or the gas concentration must be converted to pre-humidified concentration with mathematical way. The conversion generates additional source of error in getting mass emission due to the water vapor concentration has to be assumed on the perfect combustion in the engine.

As components of exhaust gas discharged from motorized vehicles such as automobiles varies with driving modes, the flow rate of the exhaust gas must be measured in real time in accordance with each driving mode. For example, as shown in FIG. 26, a conventional dilution analysis process has been adopted in which the exhaust gas in each driving mode is diluted by atmospheric gas so that the diluted exhaust gas has a constant flow rate. The diluted gas is introduced into a gas component analyzer c, and the discharge rate of each specific component is determined.

A modal mass analysis method using a dilution analysis process is known as one method for determining the discharge rate of the specific component. In this analysis method, let the flow rate of the exhaust gas sucked into the sampling passage d for performing a concentration measurement be $Q_A$ (which is a constant); let a dilution air rate measured by an ultrasonic flow meter $f$ at the dilution air inflow passage e be $Q_D(t)$; and let the total suction flow rate by the constant flow rate sampler CVS be $Q_M$ (which is a constant). Then the exhaust gas flow rate $Q_{WE}(t)$ (which contains moisture) discharged from the specimen vehicle b can be found from the following arithmetic expression:

$$Q_{WE}(t)=Q_A+Q_M-Q_D(t) \quad \text{③}$$

On the other hand, let the concentration of the components to be measured in the exhaust gas measured by the gas concentration analyzer a be $C_{WE}(t)$. Then the exhaust volume (mass) M(t) of the components to be measured in the exhaust gas can be found by the following arithmetic expression:

$$M(t)=\rho \times C_{WE}(t) \times Q_{WE}(t) \quad \text{④}$$

for each traveling mode. This kind of arithmetic method composed of Eq. ③ and Eq. ④ is the modal mass analysis method applied to the dilution analysis process. In FIG. 26 reference character g designates a heat exchanger; h, a constant flow-rate venturi pipe; i, a suction pump; j, a dehumidifier; and k, a suction pump.

Consequently, in the modal mass analysis method by the dilution analysis process described above, when a component which is the same as that to be measured in the exhaust gas is present in the atmosphere, there is a possibility in that the measurement results are influenced by this presence, and it is difficult to generate the limit in the measuring accuracy.

Even if a large flow-rate air purifier is used for dilution, it is obviously disadvantageous for the analyzer to analyze by further diluting the measured component if the measured component is at a low concentration. In addition, a great amount of investment is required for the equipment for purifying air and for the CVS (constant-volume sampler) equipment for sucking diluting air, resulting in a high cost for the overall analysis equipment, as well as an increased size.

On the other hand, in the computation of Eq. ④ for determining the mass emission rate M(t) of the component to be measured for each driving mode, the value containing the moisture, that is, the wet-based value, is used for the concentration $C_{WE}(t)$. But because the exhaust gas with moisture removed by the dehumidifier j is introduced to the gas analyzer c, the wet-based concentration $C_{WE}(t)$ is unable to be directly detected by the gas analyzer c.

Therefore, for convenience, a dry-based (i.e., free of moisture) concentration $C_{DE}(t)$ detected by the gas analyzer c is converted into the wet-based concentration $C_{WE}(t)$ separately, and changed in Eq. ④. For example, let the moisture content (i.e., the moisture content removed by the dehumidifier j) contained in the exhaust gas be $C_{H2O}(t)$. The wet-based concentration $C_{WE}(t)$ can then be determined by the following conversion equation:

$$C_{WE}(t)=C_{DE}(t) \times [1-C_{H2O}(t)] \quad \text{⑤}$$

The moisture content $C_{H2O}(t)$ is $C_{H2O}(t)=\frac{1}{10}$ (0.10) when the flow rate $Q_{WE}(t)$ of the exhaust gas is supposed to be 1, for example, when 10% moisture is contained in the total exhaust gas.

Consequently, the value of the moisture content $C_{H2O}(t)$ is unable to be actually measured, and a value considered empirically adequate (assumed value) is used. But because the actual moisture content $C_{H2O}(t)$ varies with fuels and measurement conditions, there are cases in which the wet-based concentration $C_{WE}(t)$ determined by Eq. ⑤ differs from the actual value. As a result, the value of the mass emission rate M(t) of the component to be measured which is determined by Eq. ④ cannot be said to be accurate, thereby generating difficulty in reproducibility.

Under these circumstances, it is the main object of this invention to provide an exhaust gas analyzer which can accurately measure the exhaust rate of each specific component gas in automobile exhaust gas by driving modes in real time without using diluting air, and to provide a method for computing the exhaust rate thereof.

SUMMARY OF THE INVENTION

The present invention solves the above-mentioned problems. The modal mass analysis method using trace gas of the invention uses no diluting air; therefore, it is free from any influence of specific components contained in diluting air, needs no complicated compensation for temperature or pressure of the exhaust gas, and is scarcely subject to pulsation of exhaust flow.

Because the trace gas detector and gas analyzer are arranged in parallel, it is possible to introduce exhaust gas into both apparatus at the same time. Because it is possible to determine the flow rate $Q_{DE}(t)$ of the exhaust gas measured by the trace gas detector and the concentration $C_{DE}(t)$ of the component to be measured by the gas analyzer at the same time, there is no need for adjusting time for both apparatus.

In addition, there is an advantage in that the exhaust gas can be sampled either at an optional position after leaving the combustion chamber when the trace gas is injected from the suction side of the engine or at an optional position a suitable distance from a point of injection when the trace gas is injected into the tailpipe. Also, the degree of freedom in the equipment layout is markedly improved. The elimination of the CVS equipment and the air purifier further increases the degree of freedom, and it is possible to provide equipment in a compact size and at a low cost. In addition, as the CVS equipment is not used, it has an advantage of requiring no hot air, thereby achieving a great reduction in the operating costs.

In the modal mass analysis method using trace gas of the invention, because it is possible to actually measure the dry-based flow rate $Q_{DE}(t)$ that can be directly multiplied by the dry-based concentration $C_{DE}(t)$ (see Eq. ①), it is possible to find the highly accurate measured value at high reliability without using the conventional assumed value of the moisture content in the computation process in Eq. ②.

By the way, in this method, it is possible to directly find the wet-based mass emission rate M(t) of the component to be measured by the dry-based computation in Eq. ②. The principle is described as follows. First, the following relational expression holds for the wet-based concentration $C_{WE}(t)$ and dry-based concentration $C_{DE}(t)$:

$$C_{WE}(t)=C_{DE}(t)\times[1-CH_2O(t)] \qquad ⑥$$

Between the flow rate of wet-based exhaust gas $Q_{WE}(t)$ and the flow rate of dry-based exhaust gas $Q_{DE}(t)$, the following relational expression holds:

$$Q_{WE}(t)=Q_{DE}(t)\times 1/[1-C_{H20}(t)] \qquad ⑦$$

Therefore, substituting values of $C_{DE}(t)$ and $Q_{DE}(t)$ found from Eqs. ⑥ and ⑦ into the following Eq. ② gives Eq. ④.

$$M(t)=\rho\times C_{DE}(t)\times Q_{DE}(t) \qquad ②$$
$$=\rho\times\{C_{WE}(t)/[1-C_{H20}(t)]\}\times\{Q_{WE}(t)\times[1-C_{H20}(t)]\}$$
$$=\rho\times C_{WE}(t)\times Q_{WE}(t)$$

That is, the computation Eq. ② by the dry base is equal to the computation Eq. ④ by the conventional wet base. As the moisture content $C_{H20}$ (which is unable to be actually measured) is canceled, errors generated by assumption are eliminated. Consequently, with the method of the invention, it is possible to find the measured value at higher accuracy and more improved reliability than the modal mass analysis method using the conventional dilution analysis process.

BRIEF DESCRIPTION OF THE DRAWINGS

FIG. 1 schematically shows exemplary exhaust gas analyzing equipment incorporating an exhaust gas flow measuring equipment for internal combustion engines in accordance with a first configuration according to first and second embodiments of the invention;

FIG. 2 schematically shows an exemplary trace gas analyzer for use with the measuring equipment;

FIG. 9a schematically shows the trace gas introducing portion of FIG. 8 as seen along arrow A;

FIG. 9b schematically shows the trace gas introducing portion of FIG. 8 along arrow mark B;

FIG. 10 schematically illustrates an operation of the equipment shown in FIG. 7;

FIG. 11a is a cross-sectional view of the another embodiment of the equipment shown in FIG. 7;

FIG. 11b schematically illustrates an operation of the embodiment of the equipment shown in FIG. 7;

FIG. 14a shows a simulation indicating a mixing condition of the exhaust gas and trace gas when a triangular pole is arranged in the fifth embodiment of the invention;

FIGS. 14b and 14c schematically show an arrangement of the triangular pole shown in FIG. 14(a);

FIG. 18a shows a simulation indicating the mixing condition of the exhaust gas and trace gas when a quadrangular pole is arranged in the fifth embodiment of the invention;

FIG. 18b schematically shows an arrangement of the quadrangular pole in the fifth embodiment of the invention;

DETAILED DESCRIPTION OF THE PREFERRED EMBODIMENTS

Figure 3:
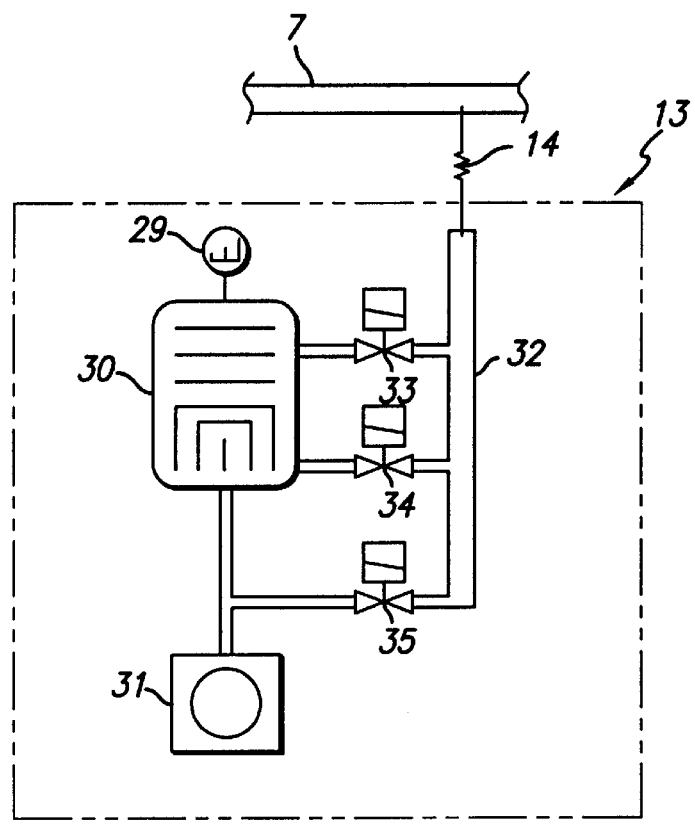
FIG. 3 shows a second configuration of the embodiment of the measuring equipment shown in FIG. 1.

Because in the first and the second embodiments, tubing with a suitable inside diameter such as capillary is used for a member to connect the gas sampling passage to the trace gas analyzer, the sample gas of a specified flow rate can be supplied to the trace gas analyzer. At the same time, the dead volume at the connections can be reduced as much as possible, and the delay in response caused by the dead volume can be reduced. Consequently, time lag associated with gas analyzers connected to the gas sampling passage can be eliminated. Consequently, the problems of conventional systems discussed above can be solved.

Because in the third and the fourth embodiments of the invention, the gas sampling passage is connected to the trace gas analyzer via a porous thin film which, for all preferable purposes permeates helium gas as trace gas, and because the atomic weight of helium is far different from that of the substance existing in the exhaust gas, the introduction of non-required exhaust gas component can be prevented, and, only helium gas can be preferably supplied to the trace gas analyzer. Consequently, the condition in which the trace gas analyzer (which is held in a high-vacuum state) causes pressure fluctuation due to the viscosity of the exhaust gas and in which the introduction rate of helium gas is varied in proportion to this fluctuation rate can be prevented. Consequently, the problem discussed above in which the sensitivity varies in accordance with change in vacuum pressure that depends on the gas component ratio in the exhaust gas can be solved.

Because in the fifth embodiment of the invention, a suitable turbulence occurs downstream from the introduction point of trace gas into the exhaust pipe and the exhaust gas is mixed with the trace gas surely and thoroughly, the exhaust gas flow rate can be accurately measured. Also, both end portions of the housing may be either brought in contact with or separated from the inner wall of the exhaust pipe. In this case, a large turbulence can be generated downstream from the introduction point of trace gas, with a pressure drop suppressed. Also the trace gas and the exhaust gas can be efficiently mixed. Consequently, the problems described above can be solved.

In the fifth embodiment of the invention, the cross-sectional profile of the tube in the flow direction of the exhaust gas may be designed to by symmetrical, such as an isosceles triangle, but may be designed to be an asymmetric triangle. Alternatively, symmetrical triangles, such a isosceles triangles, may be arranged asymmetrically so that a large turbulence such as Lancaster eddies (generated by, for example, the pressure difference) can be generated, and so that the trace gas and the exhaust gas can be mixed more efficiently. In addition, in the fifth embodiment of the invention, the cross-sectional profile of the tube is not limited to the triangular configuration but may be a quadrangle or a hexagon. In these cases, an asymmetrical form can generate larger turbulence.

In the sixth and the seventh embodiments of the invention, a calibration is carried out with care taken on $CO_2$ which is contained in a large quantity compared with $N_2$ in the exhaust gas. It thus possible to suppress the sensitivity change to a low level, and the desired calibration can be surely carried out. Consequently, the problem described above can be solved. In the sixth embodiment of the invention, a continuous mass emission rate measurement is carried out with using dehumidified flow rate, i.e., a flow rate that excludes the partial flow rate for water vapor in the total flow, and dehumidified gas concentrations. This technique eliminates the conversion of gas concentration from dehumidified to pre-humidified condition and thus cancel the error associated with the conversion.

Examples of internal combustion engines according to the first through the seventh embodiments include motors and boilers in addition to automobile engines.

FIG. 1 and FIG. 2 show a first configuration according to the first embodiment of the invention.

First of all, in FIG. 1, numeral 1 designates an automobile; numeral 2, an engine; numeral 3, and an exhaust passage linked to a tailpipe connected to the engine 2. This exhaust passage 3 comprises an exhaust pipe 3a (see, for example, FIG. 8 to FIG. 10). Numeral 4 designates a trace gas supply passage connected to an exhaust passage 3. Upstream of the trace gas supply path 4, a gas cylinder 5 containing pure helium gas as trace gas is installed. On the downstream side, a mass flow controller 6 that has both functions to measure and to control the gas flow rate is installed. The reason why helium gas is used as trace gas is that the atomic weight of helium of the substance existing in the exhaust gas is far different from that of the substance existing in the exhaust gas as compared to other inert gases such as argon.

Numeral 7 designates the gas sampling passage connected to the exhaust passage 3, which directly samples the exhaust gas undiluted with diluting gas such as air. To the gas sampling passage 7, for example, the equipment and apparatus as follows are connected. Numeral 8 designates a filter, numeral 9 designates a dehumidifier such as electronic cooling device, and numeral 10 designates a suction pump. To the gas sampling passage 7 downstream of the suction pump 10, a plurality of gas analyzers 11 are installed via parallel branch passages 12 and are designed to properly measure components contained in the exhaust gas such as CO, $CO_2$, $NO_x$, or HC. At the same time, the trace gas analyzer 13 is connected to the gas sampling passage 7 via capillary 14 which as a suitable inside diameter. Examples of the tube include the capillary 14 comprising, for example, glass, with an inside diameter on the order of, for example, 0.03 mm to 0.05 mm. For the trace gas analyzer 13, for example, a Sectorfield mass spectrometer is used for measuring the concentration of helium gas, which is a trace gas. $E_x$ designates the exhaust gas which is not taken into the gas sampling passage 7 as sample gas S.

FIG. 1 shows that a configuration of continuous mass emission measurement comprising both gas analyzers and the trace gas analyzer is placed after a dehumidifier in order to introduce dehumidified sample to both analyzers and calculation of continuous mass emission rate is carried out using dehumidified gas concentration and dehumidified flow rate.

FIG. 2 schematically shows one example of the trace gas analyzer 13. In this figure, numeral 15 designates an ion source. Inside a container 16 held to high vacuum, a filament 18 and a collector electrode 20 for collecting electrons 19 generated when the filament 18 is heated are oppositely placed on the gas inlet 17 side which is coupled to the capillary 14. At the same time, ion press-out electrode 21, pull-out electrode 22, etc. are mounted to generate ions 23. Numeral 24 designates an exhaust pump for evacuating the container 16 to a high vacuum, and numeral 25 is a pressure gauge.

Numeral 26 designates an analyzer portion linked to the ion source 15 where a magnet 27 is installed to generate a magnetic field. The analyzer portion 26 is configured to allow only the helium ion to pass. Numeral 28 designates an ion collector for collecting ion 23 passing the analyzer portion 26. The oil current obtained at this ion collector 28 is displayed as data on a recorder, such as electromagnetic oscillograph or pen recorder, via a PRE AMP and MAIN AMP which are not illustrated. Signals output from a mass flow controller 6, gas analyzer 11, and trace gas analyzer 13 are designed to be input into a processor and control unit such a microcomputer, which are not illustrated.

In the exhaust gas analyzing equipment of the above-mentioned configuration, the exhaust gas from the engine 2 of an automobile 1 leads to the exhaust passage 2. The helium gas, whose flow rate is adjusted to this exhaust gas by the mass flow controller 6 on the upstream side of the exhaust passage 3 is introduced as trace gas. The introduction rate of this event is input to the processor and control unit.

A portion of the exhaust gas mixed with helium gas is taken into the gas sampling passage 7 as same gas S. The sample gas S leads to the dehumidifier 9 via the filter 8, where it is dehumidified as required. After this dehumidifying treatment, the same gas S is supplied to gas analyzers 11 mounted, respectively, to branch passages 12 in parallel to one another via the suction pump 10, as well as to the trace gas analyzer 13 via the capillary 14.

In the gas analyzer 11, various components contained in the sample gas S are analyzed, respectively, and the results are transmitted to the processor and control unit. In the trace gas analyzer 13, the concentration of helium gas is determined, and this concentration value is also transmitted to the processor and control unit.

On the other hand, in the mass flow controller 6, since the introduction rate of helium gas as trace gas is obtained, and this is sent to the processor and control unit, it is possible to obtain the exhaust gas flow rate in real time by dividing this helium gas introducing rate by the helium gas concentration.

As described above, because the exhaust gas flow rate measuring equipment of the internal combustion engine in the above-mentioned embodiments uses the capillary 14 for a member to connect the gas sampling passage 7 for directly sampling the exhaust gas from the engine 2 to the trace gas analyzer 13, it is not only possible to feed a specified flow rate of sample gas S to the trace gas analyzer 13, but the dead volume can be reduced as much as possible and the delay of response caused by this can also be reduced. Consequently, the time lag with measurement results in the gas analyzer 11 connected to the gas sampling passage 7 can be minimized.

FIG. 3 shows a second configuration according to the first embodiment of the invention, particularly showing another mode for taking the sample gas S into the trace gas analyzer 13. In FIG. 3, numeral 29 is a mass spectrometer to which a turbo-molecular/drag pump 30 and rotary pump 31 are connected in a series. Numeral 32 is a sampling port linked to the capillary 14. Numerals 33, 34 and 35 are open/close valves respectively and intermediately installed between the sample port 32 and the center position of the turbo molecular/drag pump 30, between the sample port 32 and the turbo molecular/drag pump 30 bottom, and between the sampling port 32 and the turbo molecular/drag pump 30 and the rotary pump 31.

In the equipment configured in this way, the following effects are achieved in addition to the effects of the above-mentioned embodiment. Pressure of the sampling port 32 is variable from a high negative pressure condition to atmospheric pressure. The mass spectrometer 29 changes over the open/close valves 33–35 at the inlet port leading to the chamber in accordance with the pressure changes. Because the relevant helium gases have a high diffusion coefficient, the helium molecule can move in a reverse direction in the turbo molecular/drag pump 30, while it prevents other gas components from entering the mass spectrometer 29. In addition, as described above, since the variable pressure range is wide, even if the capillary 14 of optional length is used, no error is generated in the measurement of the trace gas analyzer 3, which is very suitable for collecting samples of the exhaust gas.

In each of the above-mentioned configurations, helium gas as a trace gas is designed to mix into the exhaust gas flowing in the exhaust passage 3 downstream of the engine 2. However, according to a second embodiment of the invention, the trace gas supply passage 4 is connected to the engine 2 as shown with a virtual line 4' in FIG. 1. In this event, as compared to the above-mentioned configuration, the volume from the engine 2 to the tailpipe become a dead volume, increasing the time lag.

In each of the above-mentioned configuration, any inert gas other than helium gas may be used as a trace gas. For the trace gas analyzer 13, various mass spectrometers, such as a quadruple mass spectrometer, may be used in addition to the Sectorfield mass spectrometer.

Figure 4:
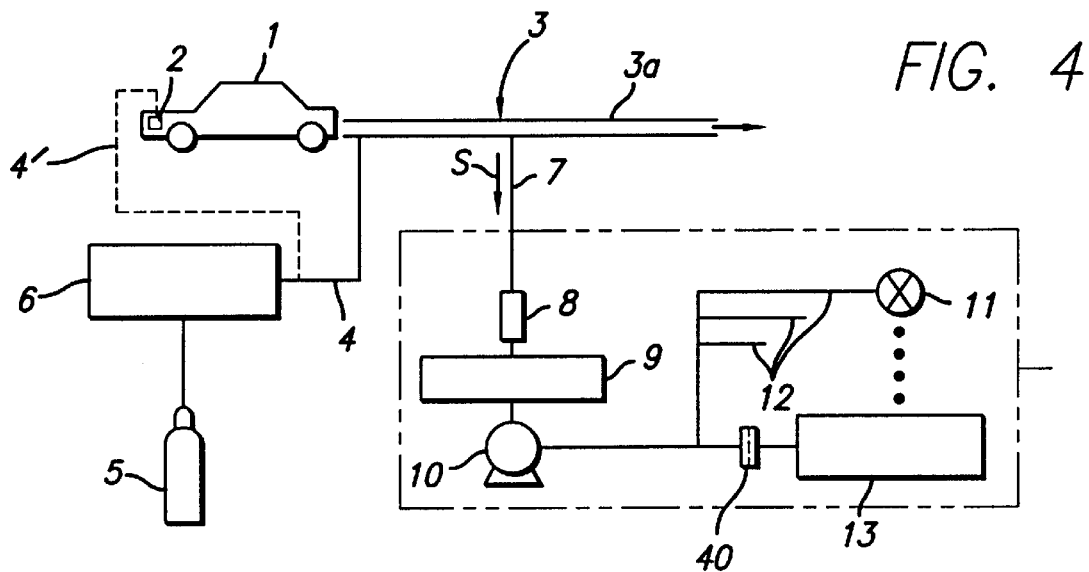
FIG. 4 schematically shows exemplary of the exhaust gas analyzing equipment incorporating an exhaust gas flow measuring equipment for the internal combustion engines in accordance with a third and the fourth embodiment of the invention.
Figure 5:
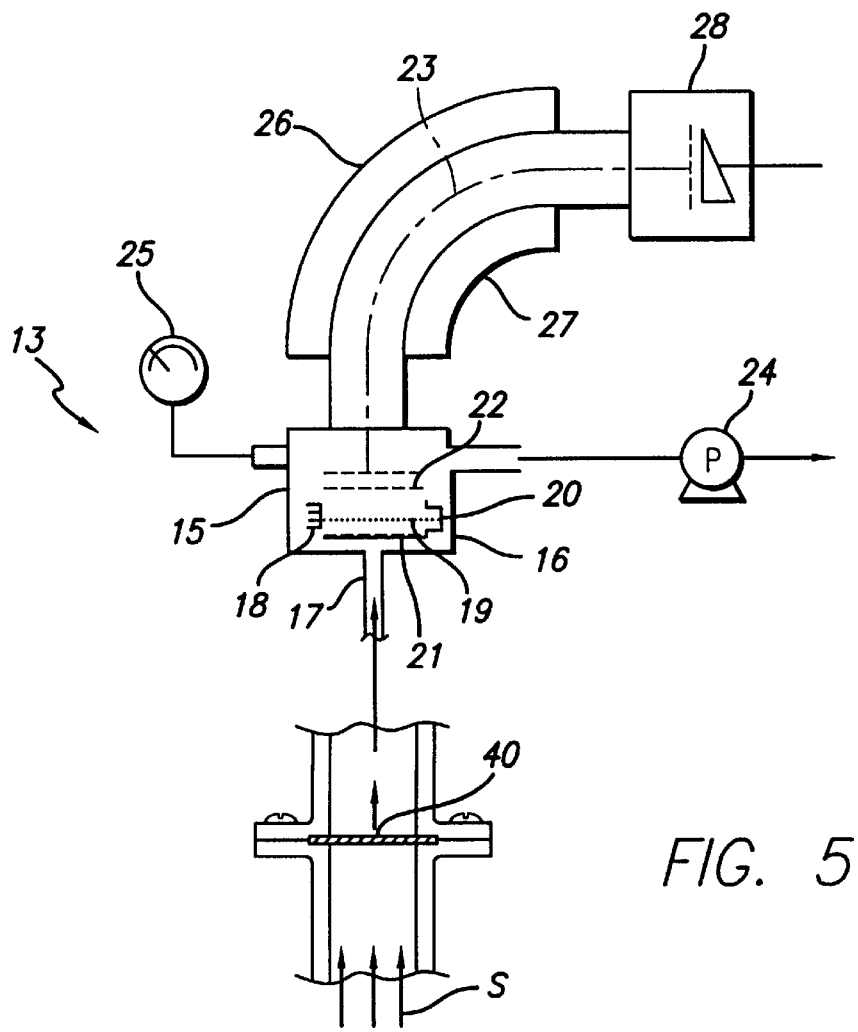
FIG. 5 schematically shows an exemplary trace gas analyzer for use with the measuring equipment shown in FIG. 4.

FIG. 4 and FIG. 5 show a first configuration according to a third embodiment of the invention in which the gas sampling passage 7 and the trace gas analyzer 13 are connected via a porous thin film 40 which preferably penetrates essentially inert helium gas as trace gas. In FIG. 4 and FIG. 5, like reference characters used in FIG. 1 and FIG. 2 designate like or corresponding parts throughout.

The porous thin film 40 may be made from polytetrafluoroethylene. The use of this material for the porous thin film 40 penetrates helium. This is assumed that the porous thin film 40 comprising polytetrafluorethylene prevents entry of unrequired exhaust gas components and supplies only helium gas to the trace gas analyzer 13.

Figure 6:
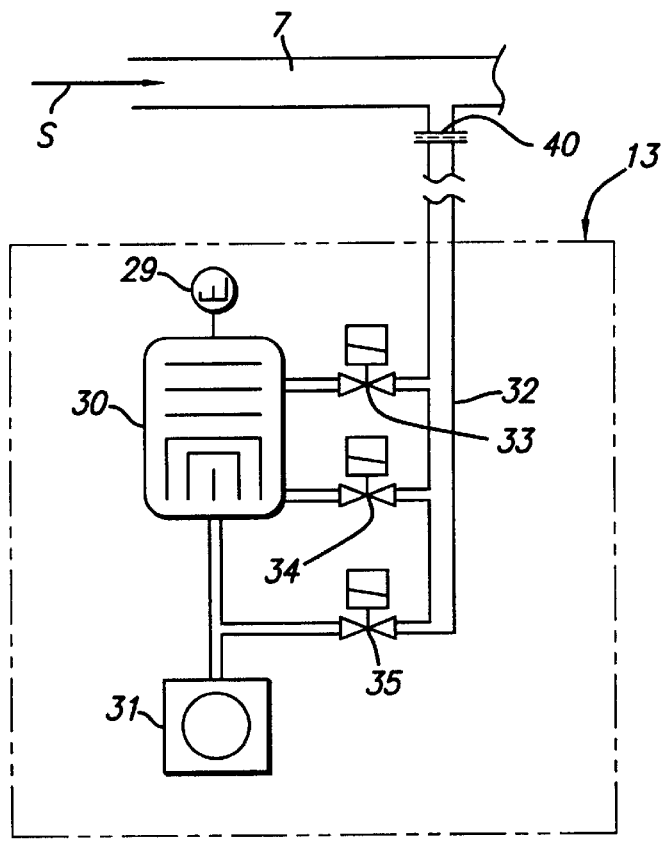
FIG. 6 shows a second configuration of the third and fourth embodiments of the gas analyzing equipment of FIG. 4.

FIG. 6 shows a second configuration of the third embodiment of the invention and indicates another mode of taking the sample gas S into the trace gas analyzer 13 when the porous thin film 40 is used. In FIG. 6, like reference characters used in FIG. 1 through FIG. 5 designate like or corresponding parts throughout.

FIG. 7 through FIG. 10 show a first configuration according to a fifth embodiment of the invention. In FIG. 7 through FIG. 10, like reference characters used in FIG. 1 through FIG. 6 above designate like or corresponding parts throughout.

Figure 8:
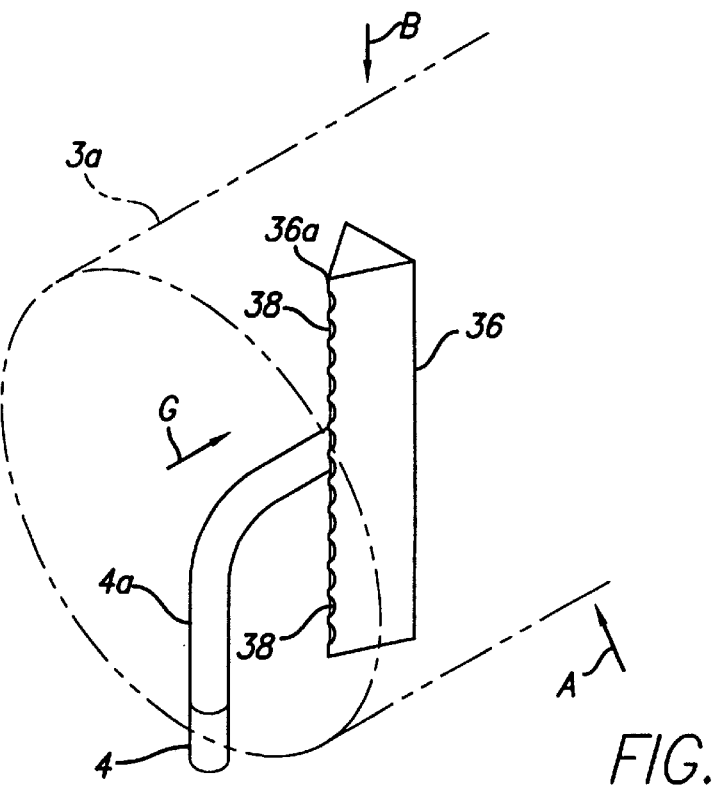
FIG. 8 is a perspective view which shows an enlarged view of a trace gas introducing portion in the exhaust gas flow rate measuring equipment shown in FIG. 7.
Figure 7:
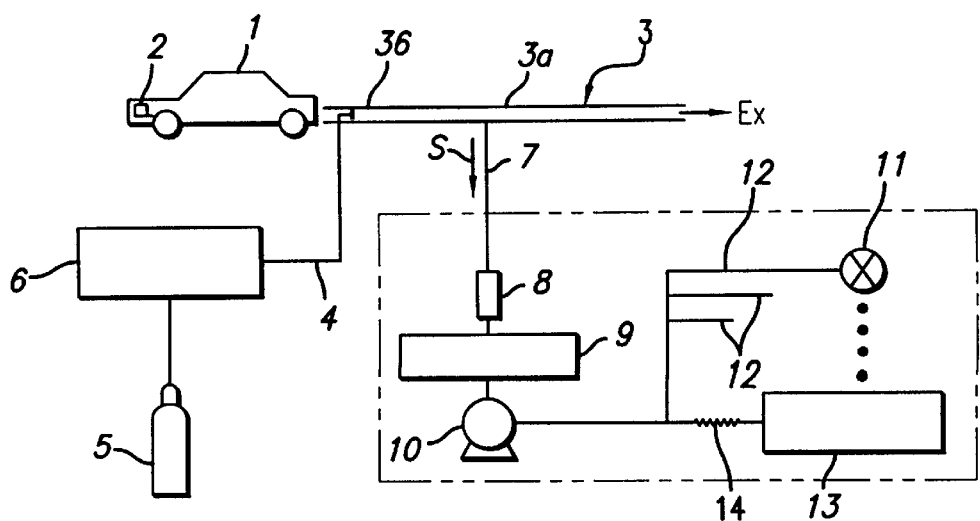
FIG. 7 schematically shows exemplary exhaust gas flow rate measuring equipment for the internal combustion engines in accordance with a first configuration of a fifth embodiment of the invention.

FIG. 7 through FIG. 9 show one example of the configuration for introducing the helium gas TG into the exhaust pipe 3a as trace gas. FIG. 8 is a perspective view of the relevant portion; FIG. 9a is a schematic representation as seen from the arrow A direction in FIG. 8; and FIG. 9b is a schematic representation as seen from the arrow B direction (which is perpendicular to arrow A) in FIG. 8. FIG. 10 schematically shows the blowout condition of helium gas TG.

In FIG. 8 and FIG. 9, numeral 4a designates a head end portion of the trace gas introducing pipe 4, which is inserted in the exhaust pipe 3a, and the top end portion 4a is bent in an L-shape along the flow of the exhaust gas G. A tube is placed at the top end portion 4a for blowing out the trace gas. The tube 36 has an outer triangular profile and an inner gas passage is placed to cause its longitudinal direction to cross the direction the exhaust gas G is flowing at right angles. Both end portions of the inner passage are separated at a suitable distance from the inner wall of the exhaust pipe 3a, with numeral 37 indicating a clearance between the end portions and the inner wall of the exhaust pipe 3a.

The cylinder 36 has an asymmetrical triangular cross-sectional profile as seen from the direction of arrow B as shown in FIG. 9b and FIG. 10. One of the vertices 36a is located on the upstream side (the direction in which exhaust gas G flows). A plurality of holes 38 for trace gas blow-out are opened in the longitudinal direction to the vertex 36a. The head end portion 4a of the trace gas introducing pipe 4 is connected to one of the outer surfaces of the cylinder 36 in free communication. The cylinder 36 is heated by a heater (not illustrated), and the temperature is controlled so that the temperature difference between the exhaust pipe 3a and the exhaust gas G is located in a specified range.

In the equipment of the above-mentioned configuration, the exhaust gas from the engine 2 of the automobile 1 leads to the exhaust pipe 3a. On the upstream side of the exhaust pipe 3a, helium gas TG, whose flow rate is adjusted by the mass flow controller 6, leads to the tube 36 via the trace gas introducing pipe 4. From the blow out hole 38 of the tube 36, exhaust gas is blown out into the exhaust pipe 3a and introduced into the exhaust pipe 3a. The introduction rate at this moment is measured by the mass flow controller 6 and input to the processor and control unit.

As the tube 36 which is asymmetric to the flow of the exhaust gas G is installed in the exhaust pipe 3a in such a manner that both end portions in the longitudinal direction do not come in contact with the inner wall of the exhaust pipe 3a (as schematically shown in FIG. 10), a turbulence occurs in the exhaust gas G at the downstream side of the tube 36, and helium gas TG blown out to the exhaust pipe 3a via the blow out hole 38 opened on the upstream side of the tube 36 is thoroughly mixed with the exhaust gas G in the turbulent condition. While helium gas TG is being blown out from the glow out hole 38 installed upstream of the tube 36, the exhaust gas G generates a turbulence downstream of the tube 36 by the tube 36 being installed asymmetrically to the flow of the exhaust gas G. At the same time, the exhaust gas G passing through the slight clearance between the tube 36 and the exhaust pipe 3a flows to the center direction of the exhaust pipe 3a, thereby generating an eddy 39 as shown in FIG. 9a. The exhaust gas G is thus thoroughly mixed with helium gas TG. In this event, pressure loss caused by the blow out of the helium gas TG and the flow rate fluctuation of helium gas TG are little, and the flow rate can be easily controlled.

As described above, a portion of the exhaust gas G thoroughly mixed with the helium gas TG is taken into the gas sampling passage 7 as sample gas S. The sample gas S taken into the gas sampling passage 7 leads to the dehumidifier 9 via the filter 8 and is dehumidified as required. The sample gas S after this dehumidifying treatment is supplied to the gas analyzers 11 installed, respectively, to the branch passages 12 in parallel to one another via the suction pump 10, and at the same time supplied to the trace gas analyzer 13 via the capillary 14.

In the gas analyzer 11, various kinds of components contained in the sample gas S are analyzed, respectively, and the results are transmitted to the processor and control unit. At the trace gas analyzer 14, the concentration of helium gas TG is determined, and this concentration value is also transmitted to the processor and control unit.

As in the mass flow controller 6 the introduction rate of helium gas TG as trace gas is obtained and as this is transmitted to the processor and control unit, by dividing this helium gas introducing rate by the helium gas concentration it is possible to obtain the exhaust gas flow rate in real time.

In the above-mentioned embodiment, the cross-sectional profile of the tube 36 is asymmetrically triangular and the tube 36 is installed asymnmetrically to the flow of the exhaust gas G. The cross-sectional profile of the tube 36 may be symmetric as, for example, an isosceles triangle, and the tube 36 with a symmetrical cross-sectional profile may be installed asymmetrically or symmetrically to the flow of the exhaust gas G. The position of the blow-out hole 38 in the tube 36 may not be limited to the upstream side of the tube 36 but may be located at any suitable position such as at the downstream side or on the side.

Figure 12:
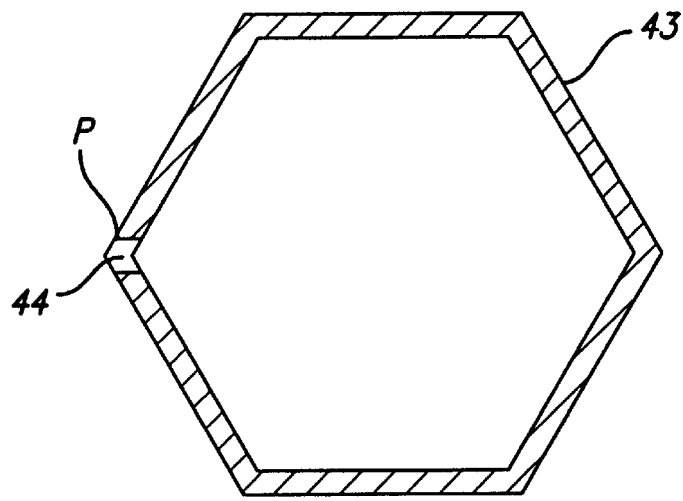
FIG. 12 is a cross-sectional view of a third configuration of a fifth embodiment of the fifth invention.

As described above, the first configuration according to the fifth embodiment of the invention has a triangular cross-sectional profile of the tube 36, but this fifth embodiment shall not be limited to this but may be formed as a quadrangle or a hexagon. Referring now to FIG. 11 and FIG. 12, description will be made on these.

First of all, FIG. 11 shows the second configuration according to the fifth embodiment. In FIG. 11a, numeral 41 designates a tube with a suitable length and a cross-sectional profile of a quadrangle, more specifically, a square. On one side of this tube 41, though it is not illustrated in detail, a plurality of blow-out holes 42 are opened in the longitudinal direction. This kind of tube 41 is placed symmetrically to the flow of the exhaust gas G so that the side 42a forming the blow-out hold 42 is located on the upstream side as shown in FIG. 1 lb. It is preferable for both end portions of tube 41 not to contact the inner wall of the exhaust pipe 3a.

In this way, in the tube 41 whose cross-sectional profile is a square, as shown in FIG. 11b, a turbulence is generated in the exhaust gas G downstream of the tube 41. The helium gas TG blown out to the exhaust pipe 3a via the blow-out hole 42 opened upstream of the tube 41 is thus thoroughly mixed with the exhaust gas G in the turbulent condition. While the helium gas TG is blown out from the blow-out hole 42 located upstream of the tube 41, the exhaust gas G generates a turbulence downstream of the tube 41 by the tube 41 being arranged asymmetrically to the flow of the exhaust gas G. The exhaust gas G passing through the slight clearance between the tube 41 and the exhaust pipe 3a flows to the center direction of the exhaust pipe 3a, thereby generating an eddy as in the case of FIG. 9a. The exhaust gas G and helium gas TG are therefore thoroughly mixed. And in this case, pressure loss caused by the blow out of the helium gas TG and the flow rate fluctuation of the helium gas TG are little, and the flow rate can be easily controlled.

In the second configuration according to the fifth embodiment of the invention, the tube 41 may be arranged to by asymmetrical to the flow of the exhaust gas G. The cross-sectional profile of the tube 41 may be a rectangle or a trapezoid, or further a simple quadrangle. In the case of the tube 41 having a with rectangular cross-sectional profile, the tube 41 is preferably arranged to be symmetrical to the flow of the exhaust gas G. The position of the blow-out hole 42 in the tube 41 shall not be limited to the upstream side of the tube 41 but may be located at a suitable position on the downstream side or on the side.

FIG. 12 shows the third configuration in the fifth embodiment of the invention. In FIG. 12, numeral 43 is a tube whose cross-sectional profile is a regular hexagon. At one vertex P of this tube 43, a plurality of low out holes 44 are opened in the longitudinal direction. The tube 43 configured in this way is placed in the exhaust pipe 3a so that the blow out hold 44 is located on the upstream side. The action and the effect when arranged in this way are the same as those of the first or the second configurations of the fifth embodiment of the invention, and their detailed explanation will be omitted. In this third configuration, the tube 43 may be arranged to be asymmetrical to the flow of the exhaust gas G. For the cross-sectional profile of the tube 43, it may be a simple hexagon. In addition, the position of the blow out hole 44 in the tube 43 is not limited to the upstream side of the tube 43 but may be located at any position such as on the downstream side or on the side.

Figure 23:
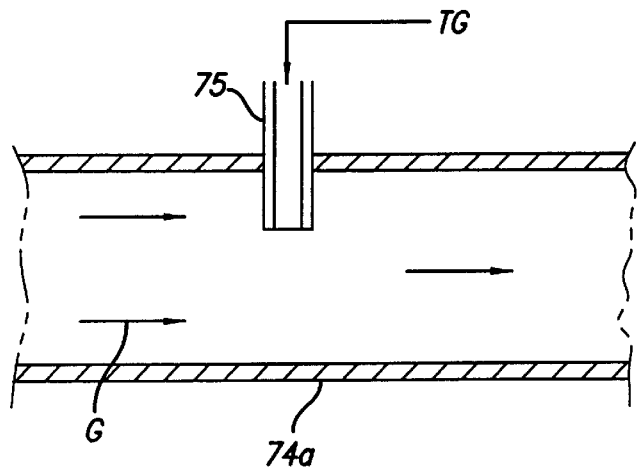
FIG. 23 is a cross-sectional view of conventional apparatus.

In the first through the third configurations of the fifth embodiment of the invention, the cross-sectional profiles of the tubes 36, 41 and 43 are designed to be a triangle, quadrangle, and hexagon, respectively, because of ease of fabrication of these profiles. For the tube, the cross-sectional profile may be a polygon larger than a septangle, but for this kind of profile, as compared to the conventional technique shown in FIG. 23, a turbulence is likely to occur, and helium gas TG can be thoroughly mixed with the exhaust gas G; however it is assumed that those profiles described in each of the above configurations achieve better mixing effects.

Figure 13:
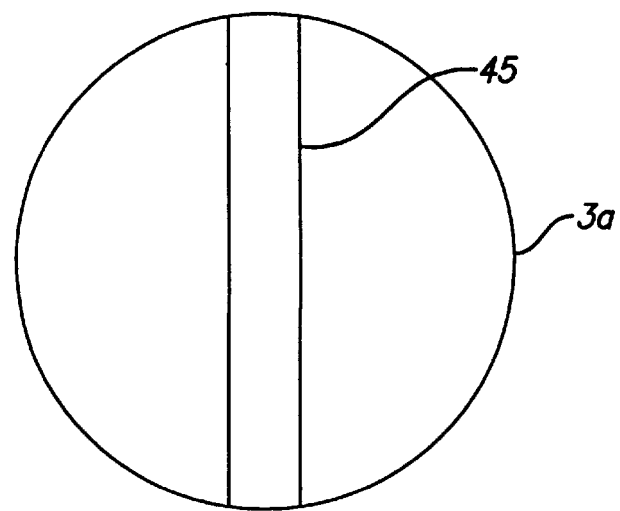
FIG. 13 shows an alternative locating form of the housing according to the fifth embodiment of the invention.

In each of the configurations described above of the fifth embodiment of the invention, the tube 36, 41 and 43 is arranged to form a slight clearance between the both end portions in the longitudinal direction of the inner wall of the exhaust pipe 3a. But as shown in FIG. 13, both end portions of the tube 45 may be designed to come in contact with the inner wall of the exhaust pipe 3a. In this event, on the inner wall dies of the exhaust pipe 3a, Lancaster eddies are difficult to be generated, and the turbulent effects slightly decrease. However, helium gas TG can be thoroughly mixed with the exhaust gas G.

FIG. 14 through FIG. 18 show simulation results using a computer of the condition when the trace gas TG is mixed into the exhaust gas G in each of the above configurations of the fifth embodiment of the invention. In the following description, the inside diameter of the exhaust pipe 3a is assumed to be 53 mm, the flow rate of the exhaust gas G flowing in the pipe 3a is assumed to be 2,000 l/min, and the Reynolds number is assumed to be constant. Reference characters a through i in each figure show the area classified by the flow velocity, with reference character "a" indicating the fastest area, with the flow velocity decreasing stepwise thereafter.

FIG. 14a shows a simulation indicating the mixing condition of the exhaust gas G and the trace gas TG around a 40 mm long triangular pole 46 when the triangular pole 46 is positioned in such a manner that both end portions do not come in contact with the inner wall of the exhaust pipe 3a as shown in FIGS. 14b and 14c. Only one half of the cylindrical exhaust pipe 3a is shown.

Figure 15A:
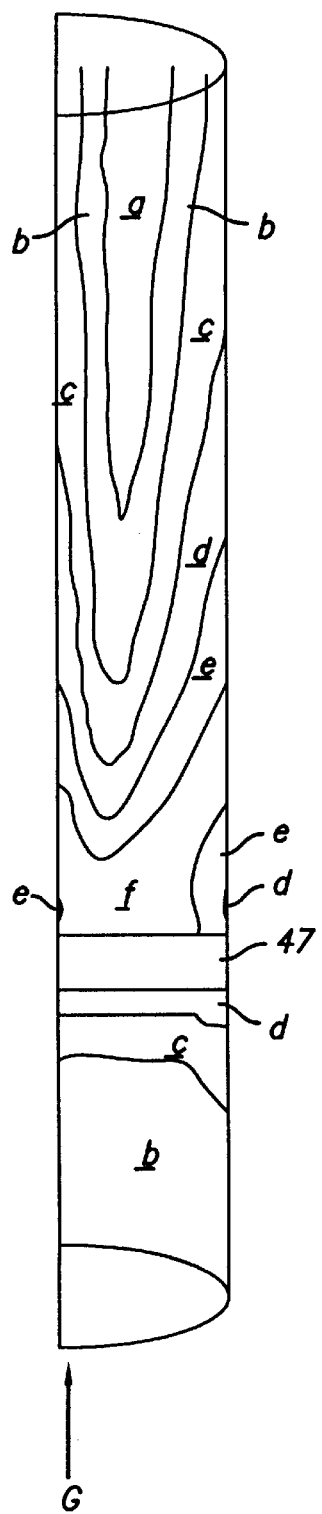
FIG. 15a shows a simulation indicating other mixing conditions of the exhaust gas and trace gas when a triangular pole is arranged in the fifth embodiment of the invention.
Figure 15B:
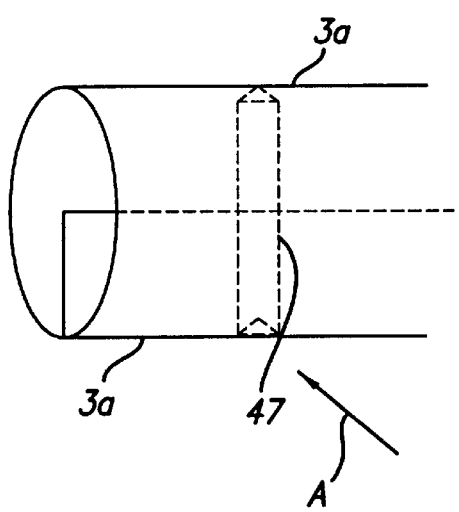
FIGS. 15b and 15c schematically show other arrangement conditions of other triangular poles in the fifth embodiment of the invention.
Figure 15C:
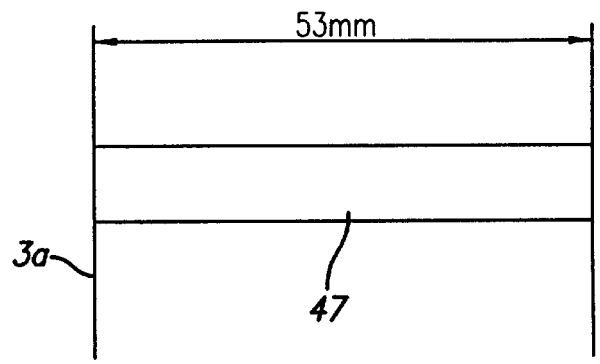

FIG. 15a shows a simulation indicating the mixing condition of the exhaust gas G and the trace gas TG around a triangular pole 47 when a 53 mm long triangular pole 47 is positioned in such a manner that both end portions come in contact with the inner wall of the exhaust pipe 3a and are arranged to be asymmetrical to the flow of the exhaust gas G as shown in FIGS. 15b and 15c.

Figure 16A:
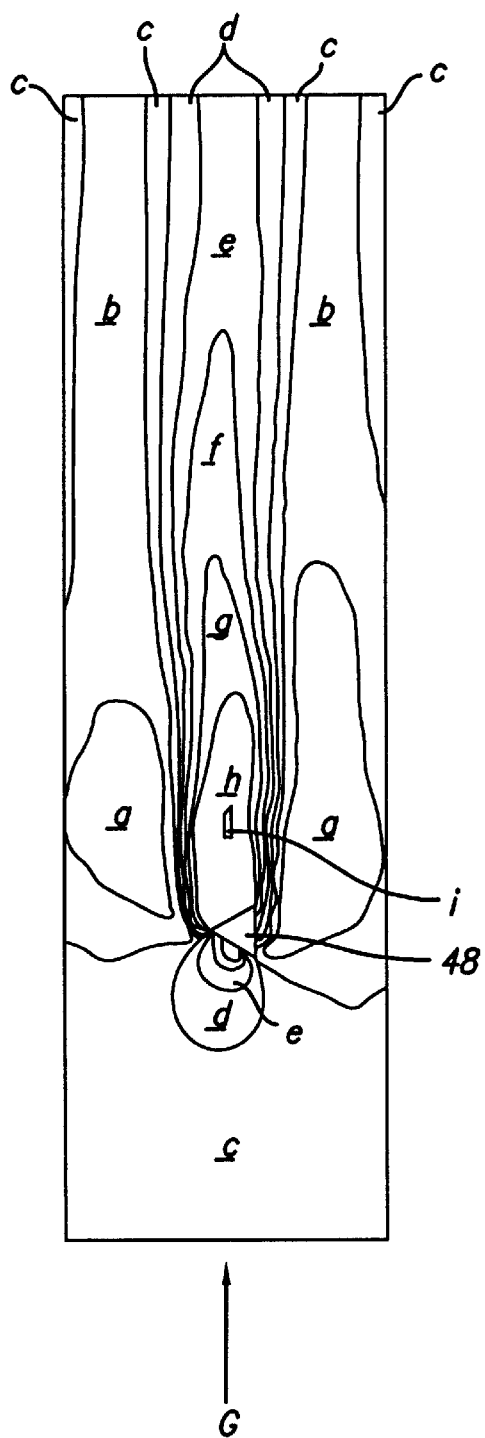
FIG. 16a shows a simulation indicating other mixing condition of the exhaust gas and trace gas when a triangular pole is arranged in the fifth embodiment of the invention.
Figure 16B:
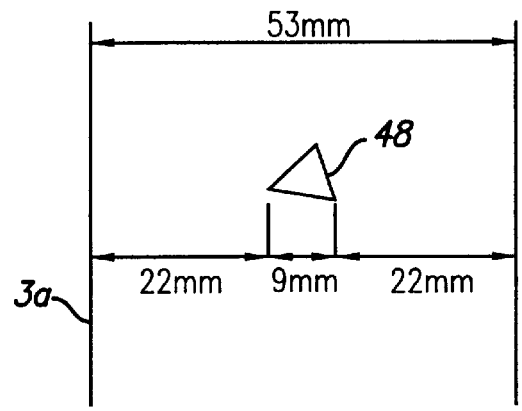
FIG. 16b schematically shows an arrangement of the triangular poles in the fifth embodiment of the invention.

FIG. 16a is a simulation indicating the mixing condition of the exhaust gas G and the trace gas TG around a triangular pole 48 when a 53 mm long triangular pole 48 whose cross-sectional profile is an isosceles triangle is positioned in such a manner that both end portions come in contact with the inner wall of the exhaust pipe 3a and are arranged to be asymmetrical to the flow of the exhaust gas G, as shown in FIG. 16b.

Figure 17A:
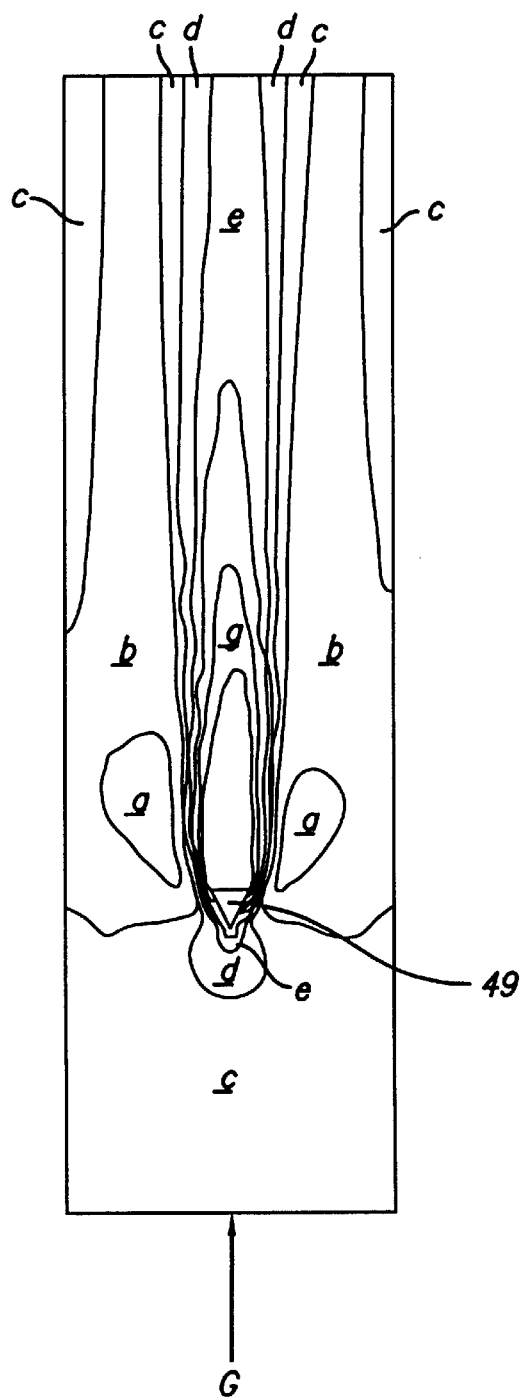
FIG. 17a shows a simulation indicating the mixing condition of the exhaust gas and trace gas when the arrangement of a triangular pole is changed in the fifth embodiment of the invention.
Figure 17B:
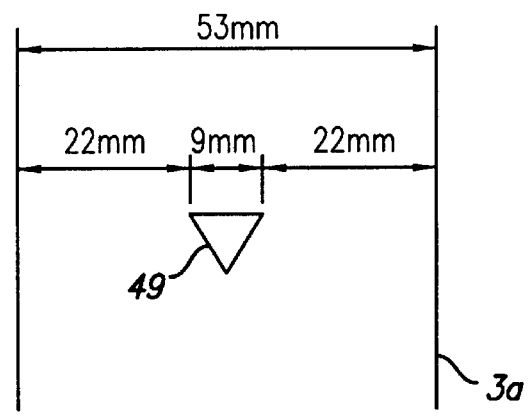
FIG. 17b schematically shows when the arrangement condition of the triangular poles is changed in the fifth embodiment of the invention.

In addition, FIG. 17a is a simulation indicating the mixing condition of the exhaust gas G and the trace gas TG around a triangle pole 49 when a 53 mm long triangular pole 49 whose cross-sectional profile is an equilateral triangular is positioned in such a manner that both end portions come in contact with the inner wall of the exhaust pipe 3a and are arranged to be symmetrical to the flow of the exhaust gas G, as shown in FIG. 17b.

Furthermore, FIG. 18a is a simulation indicating the mixing condition of the exhaust gas G and the trace gas TG around a square pole 50 when a 53 mm long square pole 50 whose cross-sectional profile is square is positioned in such a manner that both end portions come in contact with the inner wall of the exhaust pipe 3a and are arranged to be symmetrical to the flow of the exhaust gas G, as shown in FIG. 18b.

In FIG. 14 through FIG. 17 above, the blow-out hole of the trace gas TG is assumed to be located at the vertex on the upstream side, while in FIG. 18, it is assumed to be located on the side on the upstream side.

FIG. 14a and FIG. 15a show the flow velocity distribution when the triangular poles 46, 47 are respectively positioned not in contact and in contact with the inner wall of the exhaust pipe 3a. The mixing of the exhaust gas G and the trace gas TG is enhanced when the tube 46 is positioned not in contact with the inner wall of the exhaust pipe 3a. This is assumed to be similar not only when the tube cross-section is triangular but also when it is shaped as other polygons.

FIG. 16a, FIG. 17a, and FIG. 18a show the flow velocity distribution when the cross-sectional profile of the triangular poles 48, 49, and the quadrangle pole 50 are positioned to be symmetrical or asymmetrical to the flow of the exhaust gas G in the exhaust pipe 3a. As shown by these figures, the mixing of the exhaust gas G and the trace gas TG is promoted or enhanced when the cross-sectional profile is positioned by the asymmetrical. The mixing can be enhanced to a greater degree with the tube 50 whose cross-sectional profile is a quadrangular pole than with the tube 48, 49 with a triangular pole cross-sectional profile. However, the pressure loss increases upstream with respect to the flow of the exhaust gas G.

This fifth embodiment of the invention shall not be limited to each of the embodiments described above. For example, for the trace gas, inert gases other than helium gas may be used, but helium gas is preferable. This is because the atomic weight of helium is far different from that of the substance existing in the exhaust gas G. For the trace gas analyzer 13, various mass spectrometers, such as a quadruple mass spectrometer, may be used in addition to the Sectorfield mass spectrometer.

Figure 19:
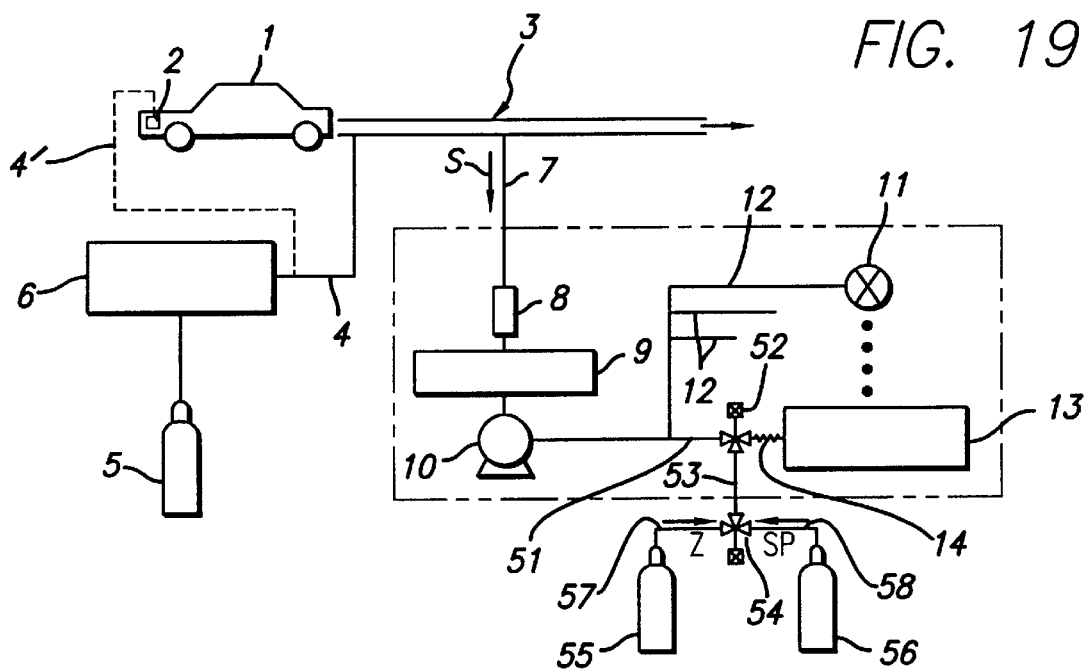
FIG. 19 schematically shows one example of the exhaust gas analyzing equipment to which a sensitivity calibration process of a trace gas flow meter according to sixth and seventh embodiments of the invention is applied.
Figure 20:
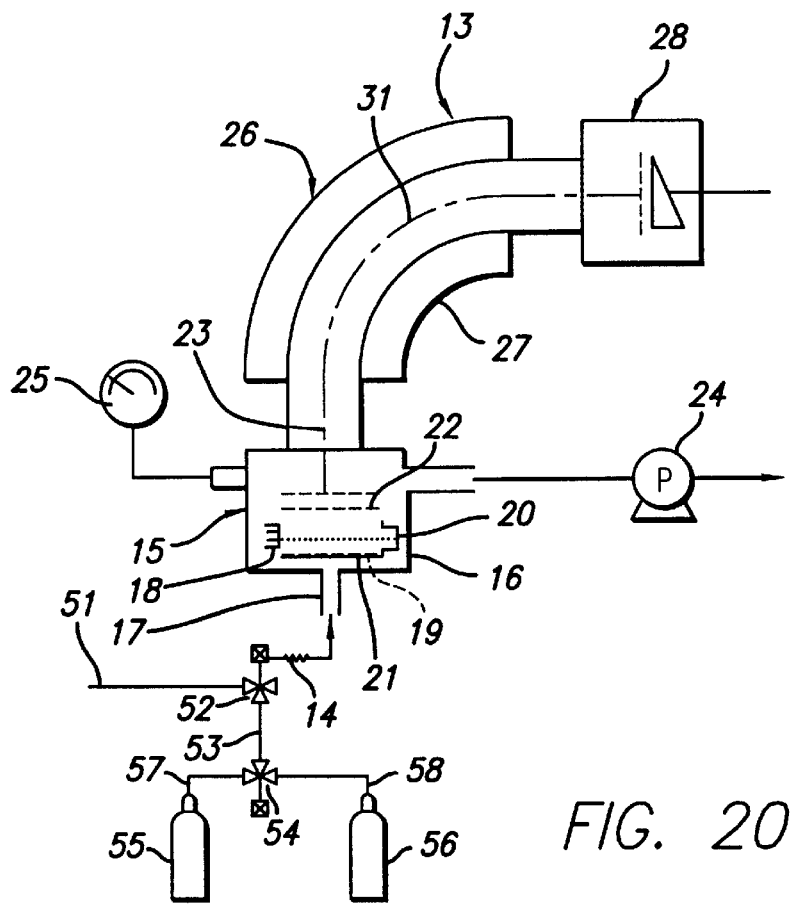
FIG. 20 schematically shows one example of the trace gas analyzer used for the exhaust gas analyzing equipment shown in FIG. 19.

FIG. 19 and FIG. 20 schematically show one example of the exhaust gas analyzing equipment to which the sensitivity calibration process of the trace gas flow meter according to the sixth embodiment of the invention may be applied. In FIG. 19 and FIG. 20, like reference characters designate like or corresponding parts throughout.

In FIG. 19 and FIG. 20 a plurality of gas analyzers 11 are installed to the gas sampling passage 7 downstream of the suction pump 10 via branch passages 12 connected in parallel to one another. The gas analyzers 11 are configured to suitably measure the component contained in the exhaust gas, such as CO, $CO_2$, $NO_x$, or HC, while the trace gas analyzer 13 is connected to the downstream end of the branch passage 51 in parallel to the branch passage 12.

Numeral 52 is a passage selector valve comprising, for example, a three-way solenoid valve, located at the branch passage 51. The trace gas analyzer 13 is connected to one port of the valve 52 via the capillary 14 with a 30 μm inside diameter. A calibration gas supply passage 53 is connected to the other port of the valve 52. At the end portion of the calibration gas supply passage 53, a passage selector valve 54 comprising, for example, a three-way solenoid valve is connected. Gas cylinders 55, 56 containing zero gas and span gas, respectively, are connected to the selector valve 54 via the passages 57, 58, respectively.

For the zero gas Z and the span gas SP contained in the cylinders 55, 56, respectively, the gas mixed with $CO_2$ contained in a large quantity compared with $N_2$ in the exhaust gas of automobile 1 at the concentration level similar to that in the exhaust gas is used. For the zero gas Z, with $N_2$ used as a base, the gas mixed with $CO_2$ in such a manner that the concentration becomes about 15% is used. For the span gas SP, with $N_2$ used as a base gas, to which some tens of to ten thousand of parts per million (ppm) of helium are added and the gas mixed with $CO_2$ in such a manner that the concentration becomes about 15%, is used.

Therefore, when the exhaust gas flow rate is analyzed, the passage selector valve 52 is operated, and the branch passage 51 is brought to be in free communication with the capillary 14. On the upstream side of the exhaust passage 3, helium gas whose flow rate is adjusted by the mass flow controller 6 is introduced to the exhaust gas as the trace gas. The introduction rate in this event is inputted to the processor and control unit.

A portion of the exhaust gas with helium gas is taken into the gas sampling passage 7 as sample gas S. The sample gas S taken into the gas sampling passage 7 leads to the dehumidifier 9 via the filter 8 and is dehumidified as required. After this dehumidifying treatment, the sample gas S is supplied to the gas analyzer 11 mounted to the parallel branch passages 12 via the suction pump 10. At the same time, the sample gas is also supplied to the trace gas analyzer via the branch passage 51, passage selector valve 52, and capillary 14.

In the gas analyzer 11, various components contained in the sample gas are analyzed, respectively, and the results are transmitted to the processor and control unit. In the trace gas analyzer 13, the concentration of helium gas is determined, and this concentration value is also transmitted to the processor and control unit.

In the mass flow controller 6, the introduction rate of helium gas as trace gas is obtained. As the introduction rate is transmitted to the processor and control unit, by dividing this helium gas introduction rate by the helium gas concentration, it is possible to obtain the exhaust gas flow rate in real time.

Next, when the trace gas analyzer 13 is calibrated, the passage selector valve 52 is operated to bring the calibration gas supply passage 53 in free communication with the capillary 14. The passage selector valve 54 is operated to supply the zero gas Z containing about 15% of $CO_2$ (with $N_2$ used as base) to the trace gas analyzer 13 via the calibration gas supply passage 53, passage selector valve 52, and capillary 14. The required zero point calibration can, thereby, be carried out. The passage selector valve 54 is then operated to supply the span gas SP with several tens of to several thousands of ppm helium gas added (with $N_2$ used as base, to which $CO_2$ is mixed to achieve about 15% concentration), to the trace gas analyzer 13 via the calibration gas supply passage 53, passage selector valve 52, and capillary 14. The required span calibration can, thereby, be carried out.

Figure 21:
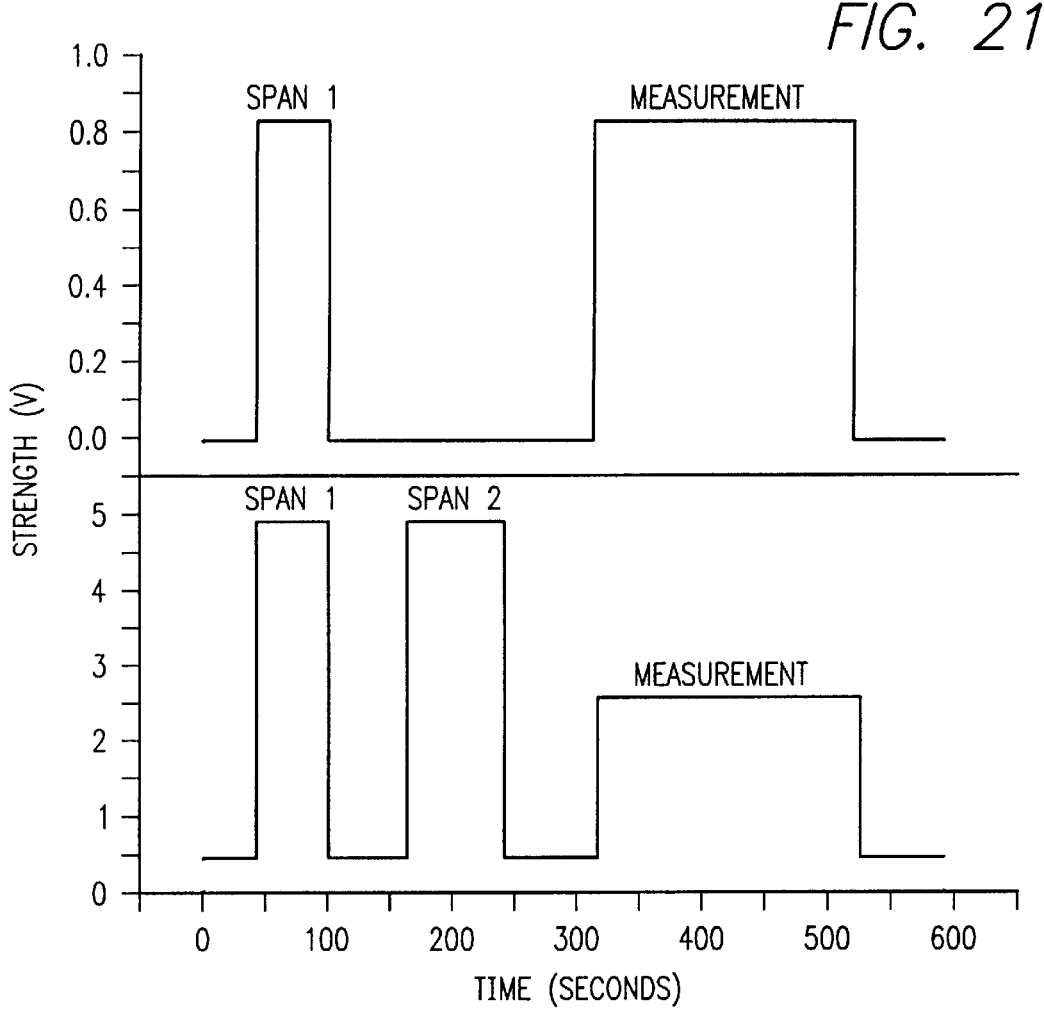
FIG. 21 shows an output of the analyzer when $CO_2$ is mixed in span gas and when $CO_2$ is not mixed in the sixth and the seventh embodiment of the invention.
Figure 22:
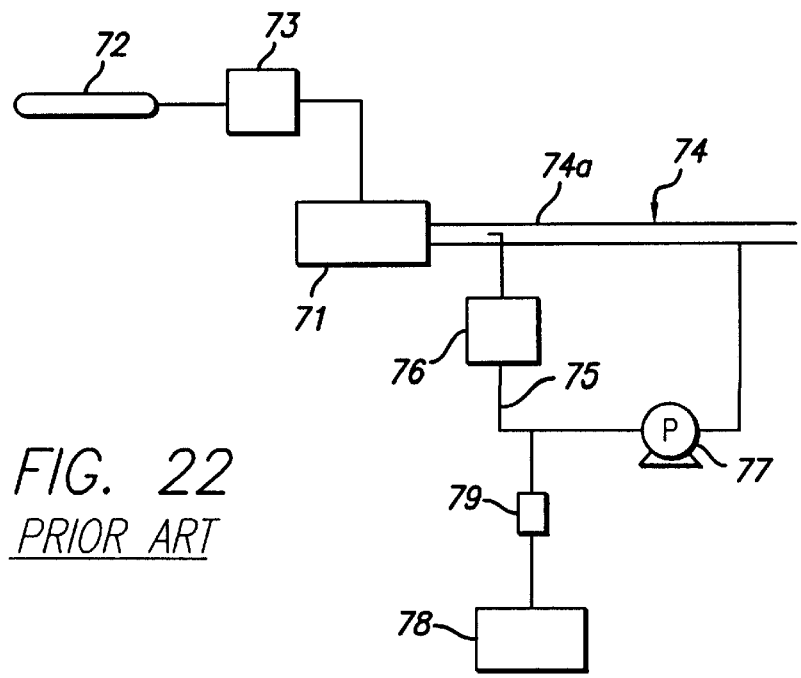
FIG. 22 is a schematic view of the conventional apparatus.

FIG. 21 shows one example of changes of the output signal with respect to time in a $CO_2$ meter (which may be any one of the gas analyzers shown with reference character 11 in FIG. 1) when 1,930 ppm of helium gas (span gas, span gas ① used in the sixth embodiment) with 14.6% $CO_2$ mixed with $N_2$ used as a bas is used for the span gas, and when 1,920 ppm of helium gas (span gas, span gas ② used in conventional technology) with $N_2$ used as a base is used for the span gas. The upper column shows the output of the $CO_2$ meter, and the lower column the output of the trace gas analyzer 13.

Suppose that the concentration of helium gas per unit strength in span gas ① and span gas ② is $C_1$, $C_2$, respectively. When calibrated with the span gas ① with no $CO_2$ mixed, the span gas ② is strength×$C_1$=1,880 ppm. When calibrated with the span gas ① with $CO_2$ mixed, the span gas ① is strength×$C_2$=1,970 ppm. That is, when calibrated with the span gas with no $CO_2$ mixed, there is a problem in that the reading of helium gas in the exhaust gas becomes higher than the actual value, and the reading of the exhaust gas flow rate becomes lower. Alternatively, there is a problem in that the reading of helium gas in the exhaust gas becomes lower than the actual value, and the reading of the exhaust gas flow rate becomes higher. In the sixth embodiment described above, since about 15% of $CO_2$ is mixed to the span gas used hitherto, the above-mentioned problems are not caused.

When the zero-point calibration is carried out, it is not always necessary to add $CO_2$ for the zero gas Z and pure $N_2$ may be designed to be used.

As described above, in the sensitivity calibration method of the trace gas flow meter according to the sixth embodiment of the invention, as the gas containing $CO_2$ in the concentration similar to that of $CO_2$ contained in the exhaust gas is used for the zero gas Z and as the span gas SP used for calibration gas, respectively, the change in the sensitivity can be suppressed to be as low as possible. In particular, in the preceding process of the trace gas analyzer 13 to which the calibration gas is supplied, because the capillary 14 which is used is the same as that used when the sample gas S is introduced to the trace gas analyzer 13 is used, the gas flow rate at the time of calibration can be set to the level same as the gas flow rate at the time of measurement. A highly accurate calibration can thus be carried out.

In the embodiment described above, helium gas as trace gas is designed to mix with the exhaust gas flowing the exhaust passage 3 downstream of the engine 2. However, it may be configured as in the case of the seventh embodiment of the invention described as below. In the seventh embodiment, the trace gas supply passage 4 is connected to the engine 2 as shown with the virtual line 4' in FIG. 19.

The sixth and seventh embodiments of the invention shall not be limited to the above-mentioned configurations, but, for example, when the calibration is carried out, the trace gas analyzer 13 is separated from the passage 51, and the downstream side of the calibration gas supply passage 53 may be connected to the other end side of the capillary 14.

For the trace gas, any inert gas other than helium gas may be used. For the trace gas analyzer 13, various mass spectrometers, such as a quadruple mass spectrometer, may be used in addition to Sectorfield mass spectrometer. In addition, this invention can be applied not only to automobile engines but may also be used to calibrate the sensitivity of a trace gas flow meter designed to measure the flow rate of the exhaust gas of the internal combustion engines such as motors and boilers.

In the exhaust gas flow rate measuring equipment of the internal combustion engines according to the first and second embodiment of the invention, since the tube with a suitable inside diameter is used for a member to connect the gas sampling passage to the trace gas analyzer, the dead volume at the connections can be reduced as much as possible, and the delay in response caused by the dead volume can be reduced. Consequently, time lag with other gas analyzers connected to the gas sampling passage can be eliminated, and the highly accurate exhaust gas analysis can be carried out.

In the exhaust gas flow rate measuring equipment of the internal combustion engines according to the third and the fourth embodiments of the invention, since the gas sampling passage is connected to the trace gas analyzer via a porous thin film which is essentially only penetratible by helium gas as trace gas, a problem in that the sensitivity varies in accordance with the gas component ratio in the exhaust gas can be solved.

In the exhaust gas flow rate measuring equipment of the internal combustion engines according to the fifth embodiment, as a tube whose cross-sectional profile is polygon is located in the exhaust pipe through which exhaust gas flows and as holes equipped in this tube are designed to spout the trace gas into the exhaust gas, a preferable turbulence is generated downstream of the point for introducing the trace gas into the exhaust pipe, and the exhaust gas and trace gas are surely and thoroughly mixed. Consequently, the exhaust gas flow rate can be measured with high accuracy.

In addition, in the sensitivity calibration method of the trace gas flow meter according to the sixth and the seventh embodiments of the invention, since calibration is carried out taking into account a large quantity of $CO_2$ with respect to $N_2$ in the exhaust gas, changes in the sensitivity can be suppressed and the desired calibration can be surely carried out.

The eighth embodiment of the invention shall not be limited to the above-mentioned embodiments. Assume the concentration of gas component A is 1/10 and at the same time water vapor exists for 1/10. Obviously the mass of the gas A is 1/10 assuming the density of gas A is 1 and the volume is also 1. The typical gas analyzer extract water vapor in order to avoid sensitivity interference from the water and then the concentration of gas A becomes 1/9. The trace gas method invented here can sample the dehumidified gas and the trace gas is also condensed as described in for the gas A. As a result, the technique can measure a flow rate that excludes partial flow of water and obtain a flow rate of 9/10. Obviously the product of the dehumidified concentration 1/9, and the dehumidified flow rate 9/10 gives the same amount of mass as calculated for pre-humidified sample.

The embodiments of the exhaust gas analyzer according to the invention and of the modal mass analysis method using trace gas will be described in detail hereinafter.

Figure 24:
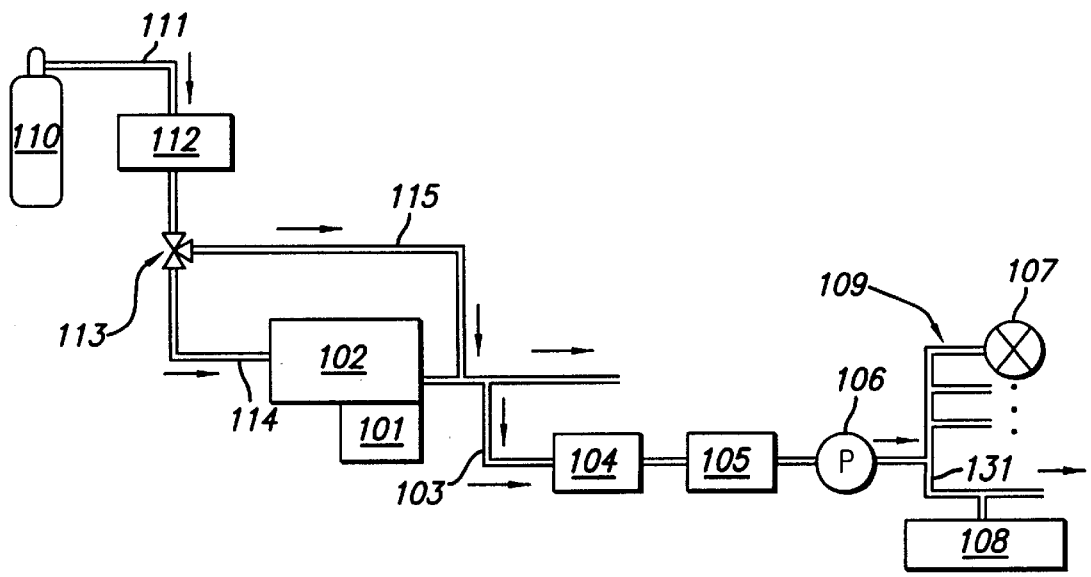
FIG. 24 is a schematic view of an exhaust gas analyzer in accordance with an exemplary embodiment of the invention.

FIG. 24 shows a basic configuration of the equipment. Numeral 101 designates a chassis dynamo; 102, the specimen vehicle; 103, an exhaust gas sampling pipe connected to a tailpipe; 104, a filter; 105, a dehumidifier; 106, a suction pump; 107, a gas analyzer using, e.g., either NDIR process or FTIR process for measuring the component to be measured; and 108, a trace gas detector (helium detector) connected to the gas analyzer 107 in parallel via a branching point 131 of the exhaust gas introducing pipe 103. An analyzer 109 includes the gas analyzer 107 and the trace gas detector 108.

Numeral 110 designates a helium (He) gas cylinder (trace gas supply source) for supplying He gas as trace gas; 111, a trace gas supply pipe; 112, a mass flow controller as a flow rate controller; 113, a three-way valve (for example, an electromagnetic three-way selector valve); 114, a branch supply pipe to be connected to the suction or intake side of the engine of the specimen vehicle 102; and 115, a branch supply pipe to be connected to the exhaust gas introducing pipe 103.

As the modal mass analysis method based on the gas trace method using He gas can be carried out with equipment configured in this way, the equipment does not have to consider the influence of the existence of a component in the atmosphere which is the same as the component to be measured in the exhaust gas. In addition, the equipment does not require any complicated compensation for temperature or pressure of the exhaust gas and is not subject to the pulsation of exhaust gas.

Because trace gas detector 108 and gas analyzer 107 are arranged in parallel, it is possible to introduce exhaust gas at the same time into both apparatus. The exhaust gas flow rate $Q_{DE}(t)$ measured by trace gas analyzer 108 and the concentration $C_{DE}(t)$ of the component measured by gas analyzer 107 can the be determined at the same time. Therefore, time adjustments are no longer required for both apparatus.

In addition, there is an advantage in that the exhaust gas can be sampled either from an optional position downstream of the combustion chamber when the He gas is injected from the suction or intake side of the engine or from an optional position at a suitable distance provided from an injection point when the He gas is injected into the tailpipe. As such, the degree of freedom in the equipment layout is markedly improved. The elimination of CVS equipment and air purifiers further increases the degree of freedom and provides equipment in a compact size and at a low cost. In addition, because the CVS equipment is not used, no hot air is required, thereby greatly reducing operating costs.

Figure 25:
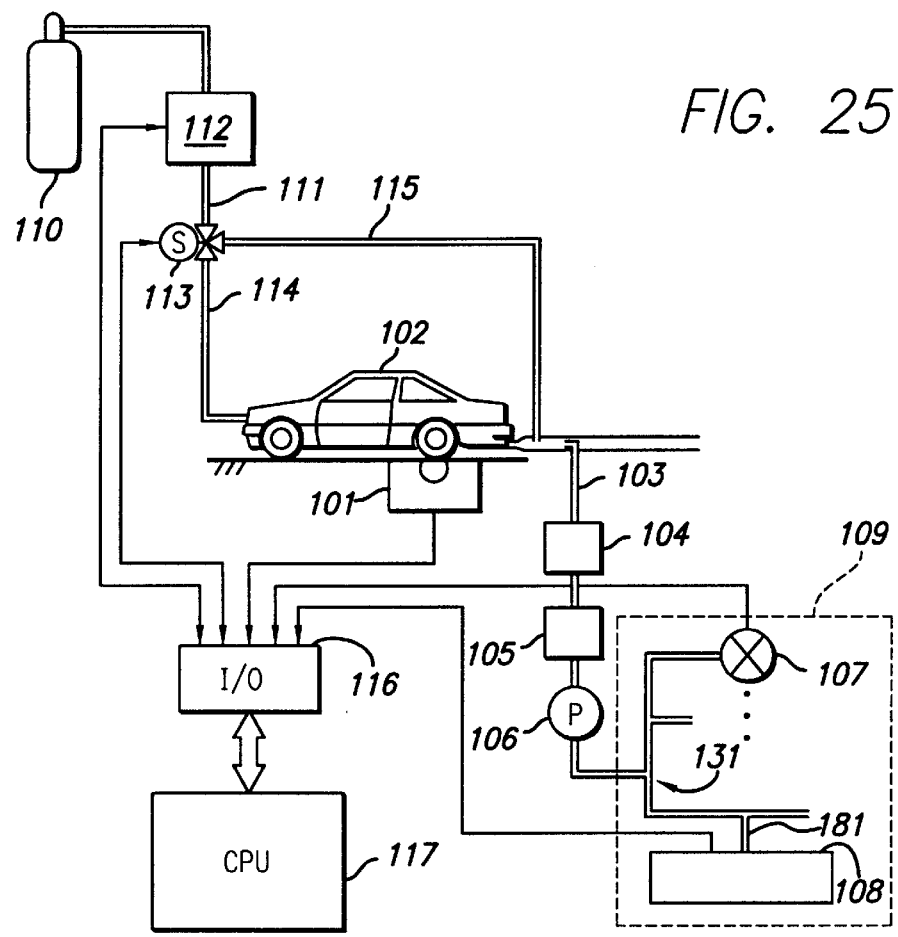
FIG. 25 is a schematic view of the exhaust gas analyzer, particularly illustrating a preferred configuration of the exhaust gas analyzer.
Figure 26:
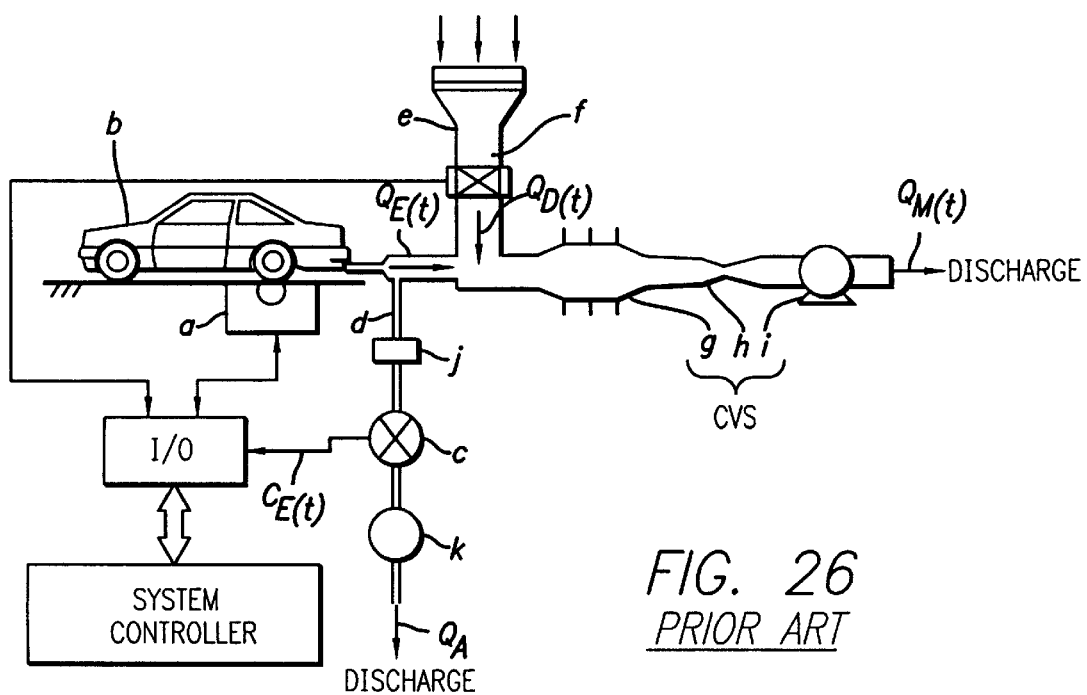
FIG. 26 is a schematic view of exemplary apparatus for performing conventional modal ideas analysis methods.

FIG. 25 shows a preferred embodiment of the equipment, wherein the chassis dynamo 101, gas analyzer 107, trace gas detector 108, mass flow controller 112, and electromagnetic three-way valve 113 are connected to a system controller (CPU) 117 containing a means for computation via an I/O interface 116. In accordance with the computation program set and stored in memory in advance according to the modal mass analysis method using the gas trace process, the mass emission rate M(t) of the specific component gas can be determined in real time in accordance with the driving pattern. To measure multiple components simultaneously, a plurality of gas analyzers are connected in parallel if the gas analyzer 107 is based on the NDIR method. When the FTIR method is used, multiple components can be simultaneously and continuously measured with only one single gas analyzer 107.

In this equipment, 100% He gas is introduced from the branch supply pipe 114 to the suction port side of the engine or from the branch supply pipe 114 to the tailpipe in order to thoroughly mix He gas with the exhaust gas after the flow rate is adjusted by the mass flow controller 112. The exhaust gas sampled downstream from the tailpipe by the exhaust gas sampling tube 103 as sample gas is introduced to the analyzer 109 via filter 104 and the dehumidifier 105. By doing so, gas analyzer 107 and trace gas detector 108 can be protected from steam, contaminant particles, etc. Numeral 181 is a capillary or film which allows only He gas to pass.

The driving mode of the vehicle 2 can be continuously changed during a specified sequence by the chassis dynamo 111 controlled and driven by commands from the system controller 107. During this period, detection signals from gas analyzer 117 and trace gas detector 108 are input into CPU 117. The mass emission rate M(t) of the component to be measured can be determined in real time by the driving mode by the following computations in accordance with the computation program stored in memory.

First, the concentration $C_H(t)$ of the trace gas is measured in the constant sampling time by trace gas detector 108. From the trace gas concentration $C_H(t)$ and the known flow rate $Q_H(t)$ of He gas, the dry-based exhaust gas flow rate $Q_{DE}(t)$ is found from the following arithmetic expression:

$$Q_{DE}(t) = Q_H(t) \div C_H(t) \qquad (1)$$

where the units used in Eq. (1) are cubic centimeters per minute (cc/min) for $Q_H(t)$, parts per million (ppm) for $C_H(t)$, and cubic meters per minute (m³/min) for $Q_{DE}(t)$.

The dry-based concentration $C_{DE}(t)$ of the component to be measured in the exhaust gas is measured by gas analyzer 117 in the same sampling time as in the case of the measurement of the He gas. By the following arithmetic expression:

$$M(t) = \rho \times C_{DE}(t) \times Q_{DE}(t), \qquad (2)$$

where $\rho$ is the density of the component to be measured, the wet-based mass emission rate $M(t)$ of the component to be measured can be determined in real time by driving modes as described before. The units used in Eq. (2) are ppm for $C_{DE}(t)$ and cc/min for $M(t)$.

In the modal mass analysis method using this kind of gas trace process, since the moisture content $C_{H2O}$ (which is the factor of generating errors as described before in the computation of Eq. (2) is canceled, it is possible to find the wet-based mass emission rate $M(t)$ at high accuracy with more simplified computation contents by directly multiplying the dry-based concentration $C_{DE}(t)$ by the dry-based flow rate $Q_{DE}(t)$ found during the same time by trace the gas detector 118. The reliability is thus remarkably improved. Consequently, particularly in measuring exhaust gas for low-pollution cars, big advantages can be achieved in good reproducibility at good sensitivity.

With respect to this point, as described above, because in conventional CVS methods (e.g., a dilution analysis method), the exhaust gas must be diluted with atmosphere, the CVS method is not suitable for present and future low emission vehicles (LEVs). The amount of pollutants discharged from LEVs has already been reduced to the level of the amount existing in the atmosphere. Even if the gas is diluted with the atmosphere, in actuality, dilution of exhaust gas is not achieved, and depending on the components, the concentration may increase. In addition, in the CVS method, detection by the gas analyzer becomes difficult even if the components are diluted when the same components are already contained in the undiluted discharge gas at low concentrations. Even if a large flow-rate air purifier is used to solve this problem, no satisfactory results have been obtained. Under these circumstances, the modal mass analysis method by the trace gas process using the equipment of the present invention which can accurately measure the exhaust gas flow rate at the end of the tailpipe without diluting it with atmosphere is provided.

As described above, according to the exhaust gas analyzer of the invention and the modal mass analysis method by the gas trace process using the exhaust gas analyzer as no dilution air is used, measurements can be carried out free of influence of specific components contained in the diluting air (atmosphere), free of any compensation of temperature or pressure of exhaust gas, and, at the same time, free of pulsation of exhaust flow.

In addition, because the trace gas detector and the gas analyzer are arranged in parallel, the exhaust gas can be introduced into both apparatus in the same time. Also, the flow rate $Q_{DE}(t)$ of the exhaust gas measured by the trace gas detector and the concentration $C_{DE}(t)$ of the components to be measured by the gas analyzer can be determined at the same time, and time adjustments between the two apparatus are no longer needed.

In addition, there is an advantage in that the exhaust gas can be sampled either at an optional position downstream of the combustion chamber when the trace gas is injected from the suction side of the engine or at an optional position at a suitable distance from the point where the trace gas is injected into the tailpipe. The degree of freedom in the equipment layout is thus markedly improved. Furthermore, in the modal mass analysis method using trace gas and the above-described equipment, because it is possible to actually measure the dry-based flow rate $Q_{DE}(t)$ that can be directly multiplied by the dry-based concentration $C_{DE}(t)$ (see Eq. (1)), it is possible to find the highly accurate measured value at high reliability without using the conventional assumed value of the moisture content in the computation process in Eq. (2).

What is claimed is:

1. A modal mass analysis method comprising the steps of:
   providing an exhaust gas analyzer for measuring a dry-based concentration and a dry-based flow rate of exhaust gas from a vehicle said exhaust gas analyzer comprising:
   a trace gas supply source for providing a trace gas to the vehicle at a supply rate;
   a flow rate controller for controlling said supply rate of said trace gas;
   an exhaust gas sampling passage in communication with an exhaust pipe of the vehicle for sampling the exhaust gas from the vehicle;
   a dehumidifier disposed on said exhaust gas sampling passage;
   a trace gas detector disposed on said exhaust gas sampling passage for measuring the trace gas; and
   a gas analyzer disposed on said exhaust gas sampling passage for measuring a component to be measured in the exhaust gas;
   said trace gas detector and said gas analyzer being disposed downstream from said dehumidifier and in parallel on the exhaust gas sampling passage;
   discharging exhaust gas from a vehicle;
   introducing a trace gas into said exhaust gas at a flow rate $Q_H(t)$;
   determining an exhaust gas flow rate $Q_{DE}(t)$ from said flow rate $Q_H(t)$ by utilizing a gas trace process in accordance with a driving simulation test based on a driving sequence;
   determining a concentration $C_H(t)$ of said trace gas in said exhaust gas in a predetermined sampling time by using an arithmetic expression of $Q_{DE}(t) = Q_H(t) \div C_H(t)$;
   determining a concentration $C_{DE}(t)$ of said component to be measured in said exhaust gas in said predetermined sampling time by using an arithmetic expression $Q_{DE}(t) = Q_H(t) \div C_{DE}(t)$; and
   determining a mass emission rate $M(t)$ of said component to be measured by driving modes by an arithmetic expression of $M(t) = \rho \times C_{DE}(t) \times Q_{DE}(t)$, where $\rho$ is a density of said component to be measured.

2. The method of claim 1, further comprising computing means including memory for determining a mass emission rate $M(t)$ of said component to be measured by driving modes in accordance with a computation program by means of a modal mass analysis method using a gas trace process stored in said memory.

3. The method of claim 1, wherein the trace gas is an inert gas.

4. The method of claim 3, wherein the inert gas is helium gas.

5. The method of claim 1, wherein the trace gas detector is a mass spectrometer.

6. An exhaust gas analyzer for measuring a dry-based concentration and a dry-based flow rate of exhaust gas from a vehicle, said exhaust gas analyzer comprising:

a trace gas supply source for providing a trace gas to the vehicle at a supply rate;

a flow rate controller for controlling said supply rate of said trace gas;

an exhaust gas sampling passage in communication with an exhaust pipe of the vehicle for sampling the exhaust gas from the vehicle;

a dehumidifier disposed on said exhaust gas sampling passage;

a trace gas detector disposed on said exhaust gas sampling passage for measuring the trace gas; and a gas analyzer disposed on said exhaust gas sampling passage for measuring a component to be measured in the exhaust gas;

said trace gas detector and said gas analyzer being disposed downstream from said dehumidifier and in parallel on the exhaust gas sampling passage;

wherein said trace gas is an inert gas.

7. The exhaust gas analyzer of claim 6, wherein said inert gas is helium gas.

8. The method of claim 7, further comprising computing means including memory for determining a mass emission rate $M(t)$ of said component to be measured by driving modes in accordance with a computation program by means of a modal mass analysis method using a gas trace process stored in said memory.

9. An exhaust gas analyzer for measuring a dry-based concentration and a dry-based flow rate of exhaust gas from a vehicle, said exhaust gas analyzer comprising:

a trace gas supply source for providing a trace gas to the vehicle at a supply rate;

a flow rate controller for controlling said supply rate of said trace gas;

an exhaust gas sampling passage in communication with an exhaust pipe of the vehicle for sampling the exhaust gas from the vehicle;

a dehumidifier disposed on said exhaust gas sampling passage;

a trace gas detector disposed on said exhaust gas sampling passage for measuring the trace gas, wherein said trace gas detector is a mass spectrometer; and a gas analyzer disposed on said exhaust gas sampling passage for measuring a component to be measured in the exhaust gas;

said trace gas detector and said gas analyzer being disposed downstream from said dehumidifier and in parallel on the exhaust gas sampling passage.

10. The method of claim 9, further comprising computing means including memory for determining a mass emission rate $M(t)$ of said component to be measured by driving modes in accordance with a computation program by means of a modal mass analysis method using a gas trace process stored in said memory.

* * * * *